United States Patent
Rossi

(10) Patent No.: US 8,787,726 B2
(45) Date of Patent: Jul. 22, 2014

(54) STREAMING VIDEO NAVIGATION SYSTEMS AND METHODS

(71) Applicant: Antonio Rossi, Rome (IT)

(72) Inventor: Antonio Rossi, Rome (IT)

(*) Notice: Subject to any disclaimer, the term of this patent is extended or adjusted under 35 U.S.C. 154(b) by 0 days.

(21) Appl. No.: 13/776,609

(22) Filed: Feb. 25, 2013

(65) Prior Publication Data

US 2013/0223812 A1   Aug. 29, 2013

Related U.S. Application Data

(60) Provisional application No. 61/603,341, filed on Feb. 26, 2012.

(51) Int. Cl.
*H04N 5/77* (2006.01)

(52) U.S. Cl.
CPC .................................. *H04N 5/772* (2013.01)
USPC ......................................................... 386/224

(58) Field of Classification Search
CPC ....... H04N 5/765; H04N 5/772; H04N 5/783; H04N 21/00; H04N 9/87
USPC ......................................................... 386/224
See application file for complete search history.

(56) References Cited

U.S. PATENT DOCUMENTS

| | | |
|---|---|---|
| 4,037,250 A | 7/1977 | McGahan et al. |
| 4,361,852 A | 11/1982 | Katzfey |
| 4,547,816 A | 10/1985 | Sochor |
| 4,814,869 A | 3/1989 | Robert, Jr. |
| 5,247,300 A | 9/1993 | Sohn |
| 5,550,982 A | 8/1996 | Long et al. |
| 5,570,296 A | 10/1996 | Heyl et al. |
| 5,673,357 A | 9/1997 | Shima |
| 5,719,786 A | 2/1998 | Nelson et al. |

(Continued)

FOREIGN PATENT DOCUMENTS

| | | |
|---|---|---|
| EP | 0847200 | 6/1996 |
| EP | 1377060 | 1/2004 |

(Continued)

OTHER PUBLICATIONS

Verhasselt, Heath., "Verhasselt: Superbowl Streaming, a Milestone for Events Worldwide." www.iowastatedaily.com/opinion/article_9f58cd28-5106-11e1-b4a4-001871e3ce6c.html (Updated Tuesday, May 22, 2012) (Retrieved on Jul. 29, 2013).

(Continued)

*Primary Examiner* — Thai Tran
*Assistant Examiner* — William Tran
(74) *Attorney, Agent, or Firm* — Steinfl & Bruno LLP

(57) ABSTRACT

The multimedia systems and methods disclosed herein permit rapid switching from one video stream to another in order to present similar images at different camera angles. The systems and methods further describe a virtual joystick and a moviola system. The virtual joystick allows a viewer to select for viewing in a main portion of a display, a sequence of images at a different camera angle than what was previously rendered on the main portion. The different camera angle is intuitively obvious based on a spatial relationship between two or more thumbnail display windows displayed in the virtual joystick. The moviola system allows rapid backwards navigation of a video stream that has already been received in a video receiver, and also allows slow motion backwards/forwards viewing starting from a paused image.

27 Claims, 9 Drawing Sheets

(56) References Cited

U.S. PATENT DOCUMENTS

| | | | |
|---|---|---|---|
| 5,805,763 A | 9/1998 | Lawler et al. | |
| 5,841,432 A | 11/1998 | Carmel et al. | |
| 5,850,352 A | 12/1998 | Jain et al. | |
| 5,884,004 A | 3/1999 | Sato et al. | |
| 5,894,320 A | 4/1999 | Vancelette | |
| 5,949,792 A | 9/1999 | Yasuda et al. | |
| 5,996,015 A | 11/1999 | Day et al. | |
| 6,008,867 A | 12/1999 | Cooper et al. | |
| 6,035,341 A | 3/2000 | Nunally et al. | |
| 6,122,668 A | 9/2000 | Teng et al. | |
| 6,195,680 B1 | 2/2001 | Goldszmidt et al. | |
| 6,236,395 B1 | 5/2001 | Sezan et al. | |
| 6,269,394 B1 | 7/2001 | Kenner et al. | |
| 6,310,661 B1 | 10/2001 | Arsenault | |
| 6,356,294 B1 | 3/2002 | Martin et al. | |
| 6,578,201 B1 | 6/2003 | LaRocca et al. | |
| 6,681,398 B1 | 1/2004 | Verna | |
| 6,744,463 B2 | 6/2004 | Rye et al. | |
| 7,047,305 B1 | 5/2006 | Brooks et al. | |
| 7,644,172 B2 | 1/2010 | Stewart et al. | |
| 7,684,565 B2 | 3/2010 | Medvinsky | |
| 8,046,479 B2 | 10/2011 | Einarsson et al. | |
| 8,272,008 B2 | 9/2012 | Meek et al. | |
| 8,382,591 B2 | 2/2013 | Toy et al. | |
| 8,387,099 B2 | 2/2013 | Perlman et al. | |
| 8,660,404 B2* | 2/2014 | Itoh | 386/241 |
| 2008/0159717 A1* | 7/2008 | Lee | 386/124 |
| 2008/0267362 A1 | 10/2008 | Lukasik et al. | |
| 2011/0202674 A1 | 8/2011 | Su et al. | |
| 2011/0231515 A1 | 9/2011 | Day et al. | |
| 2012/0208512 A1* | 8/2012 | Maharajh et al. | 455/414.1 |

FOREIGN PATENT DOCUMENTS

| | | |
|---|---|---|
| EP | 1949681 | 7/2008 |
| EP | 2036350 | 3/2009 |
| EP | 2088770 | 8/2009 |
| EP | 2225006 | 9/2010 |
| EP | 2227017 | 9/2010 |
| JP | 410136277 | 5/1998 |
| WO | 03/096676 | 11/2003 |
| WO | 2005/002351 | 1/2005 |
| WO | 2006/057606 | 1/2006 |

OTHER PUBLICATIONS

Zambelli, Alex., "IIS Smooth Streaming Technical Overview" www.google.com/url?sa=t&rct=j&q=&esrc=s&source=web&cd=2&ved=0CDIQFjAB&url=http%3A%2F%2Fjmvm.vse.cz%2Fwpcontent%2Fuploads%2F2011%2F05%2Ft_IIS_Smooth_Streaming_Technical_Overview.pdf&ei=M9RCT7sIPP54QTQ8bm0CA&usg=AFQjCNHTmtkXZtpn3ydrx7wFIp1w_4fHbg (Published in 2009) (Retrieved on Jul. 29, 2013).
Adobe Flash Media Server 3.5, "Dynamic Streaming" help.adobe.com/en_US/FlashMediaServer/3.5_Deving/WS5b3ccc516d4fbf351e63e3d11a0773d56e-7fea.html (Retrieved Jun. 19, 2013).
Wikipedia, "Group of Pictures" en.wikipedia.org/wiki/Group_of_pictures) (Last modified on Feb. 26, 2013) (Retrieved on Jun. 19, 2013).
Apple Developer, "AV Foundation Framework Reference" developer.apple.com/library/ios/#documentation/AVFoundation/Reference/AVFoundationFramework/_index.html#//apple_ref/doc/uid/TP40008072 (Published on Dec. 13, 2012) (Retrieved on Jul. 29, 2013).
iTunes Preview, "iPov3 player by Yochtle Limited" itunes.apple.com/us/app/ipov3-player/id416334245?mt=8 (Updated Feb. 14, 2011) (Retrieved on Jun. 19, 2013).
Apple Developer, "UIViewController Class Reference." developer.apple.com/library/ios/#DOCUMENTATION/UIKit/Reference/UIViewController_Class/Reference/Reference.html.(Published on Sep. 19, 2012) (Retrieved on Jul. 29, 2013).
Apple Developer, "UIView Class Reference" developer.apple.com/library/ios/#documentation/UIKit/Reference/UIView_Class/UIView/UIView.html. (Published on Sep. 19, 2012) (Retrieved on Jul. 29, 2013).
Apple Developer, "AVPlayer Class Reference" developer.apple.com/library/ios/#documentation/AVFoundation/Reference/AVPlayer_Class/Reference/Reference.html.(Published Dec. 13, 2012) (Retrieved on Jul. 29, 2013).
Apple Developer, "AVPlayerItem Class Reference" developer.apple.com/library/ios/#documentation/AVFoundation/Reference/AVPlayerItem_Class/Reference/Reference.html. (Published on Sep. 19, 2012) (Retrieved on Jul. 29, 2013).
Apple Developer, "Key-Value Observing Programming Guide." developer.apple.com/library/ios/#documentation/Cocoa/Conceptual/KeyValueObserving/KeyValueObserving.html#//apple_ref/doc/uid/10000177i. (Published Jul. 17, 2012) (Retrieved on Jul. 29, 2013).
Apple Developer, "UIImageView Class Reference" developer.apple.com/library/ios/#documentation/UIKit/Reference/UIImageView_Class/Reference/Reference.html (Published on Sep. 19, 2012) (Retrieved on Jul. 29, 2013).
Apple Developer, "UIPanGestureRecognizer Class Reference" developer.apple.com/library/ios/#DOCUMENTATION/UIKit/Reference/UIPanGestureRecognizer_Class/Reference/Reference.html (Published on Sep. 19, 2012) (Retrieved on Jul. 29, 2013).
Apple Developer, "UISwipeGestureRecognizer Class Reference" developer.apple.com/library/ios/#DOCUMENTATION/UIKit/Reference/UISwipeGestureRecognizer_Class/Reference/Reference.html (Published on Nov. 15, 2010) (Retrieved on Jul. 29, 2013).
Apple Developer, "AVPlayerLayer Class Reference" developer.apple.com/library/ios/#DOCUMENTATION/AVFoundation/Reference/AVPlayerLayer_Class/Reference/Reference.html (Published on Dec. 23, 2012) (Retrieved on Jul. 29, 2013).
Apple Developer, "AVAssetImageGenerator Class Reference" developer.apple.com/library/ios/#documentation/AVFoundation/Reference/AVAssetImageGenerator_Class/Reference/Reference.html(Published on Sep. 19, 2012) (Retrieved on Jul. 29, 2013).
Apple Developer, "CATransition Class Reference" developer.apple.com/library/ios/#documentation/GraphicsImaging/Reference/CATransition_class/Introduction/Introduction.html (Published on Feb. 16, 2013) (Retrieved on Jul. 29, 2013).
Apple Developer, "CMTime Reference" developer.apple.com/library/ios/#documentation/CoreMedia/Reference/CMTime/Reference/reference.html (Published on Jan. 28, 2013) (Retrieved on Jul. 29, 2013).
Amazon Web Services, "Amazon EC2 Instances" aws.amazon.com/ec2/instance-types/ (Published in 2013) (Retrieved on Jun. 19, 2013).
Apple Developer, "UIRotationGestureRecognizer Class" developer.apple.com/library/ios/#documentation/UIKit/Reference/UIRotateGestureRecognizer_Class/Reference/Reference.html (Published on Sep. 19, 2012) (Retrieved on Jul. 29, 2013).
www.imoveinc.com (Published in 2010) (Retrieved on Jul. 30, 2013).
www.endemol.com (Published in 2013) (Retrieved on Jul. 30, 2013).
www.cbs.com/primetime/bigbrother (Published in 2013) (Retrieved on Jul. 30, 2013).
Developing with MSXML, Data Developer Center msdn.microsoft.com/xml/general/wsdl.asp (Published in 2013) (Retrieved on Jun. 19, 2013).
Code Extended Data Type [AX 2012] msdn.microsoft.com/code/sample.asp?url=/msdn-files/027/001/580 (Published in 2013) (Retrieved on Jun. 19, 2013).
Kunda, Mike, "Re:Question on 18" Dish Service Providers!" Google Groups Newsgroup: alt.home.repair Oct. 27, 1997.
Warnock, Todd; "Primestar—GOOD experiences and a good deal" Google Group Newsgroup: rec.video.satellite.dbs Dec. 7, 1994.
Martzke, Rudy; "Instant replay gets Matrix-like view of key plays", USATODAY.com Jan. 24, 2001.

(56) References Cited

OTHER PUBLICATIONS

Non-Final Office Action for U.S. Appl. No. 09/897,708, filed Jul. 2, 2001 in the name of Fillipo Costanzo et al. mail date: Nov. 3, 2004.
Final Office Action for U.S. Appl. No. 09/897,708, filed Jul. 2, 2001 in the name of Fillipo Costanzo et al. mail date: Aug. 5, 2005.
Non-Final Office Action for U.S. Appl. No. 09/897,708, filed Jul. 2, 2001 in the name of Fillipo Costanzo et al. mail date: Apr. 13, 2006.
Final Office Action for U.S. Appl. No. 09/897,708, filed Jul. 2, 2001 in the name of Fillipo Costanzo et al. mail date: Sep. 19, 2006.
Notice of Allowance for U.S. Appl. No. 09/897,708, filed Jul. 2, 2001 in the name of Fillipo Costanzo et al. mail date: Mar. 24, 2009.

* cited by examiner

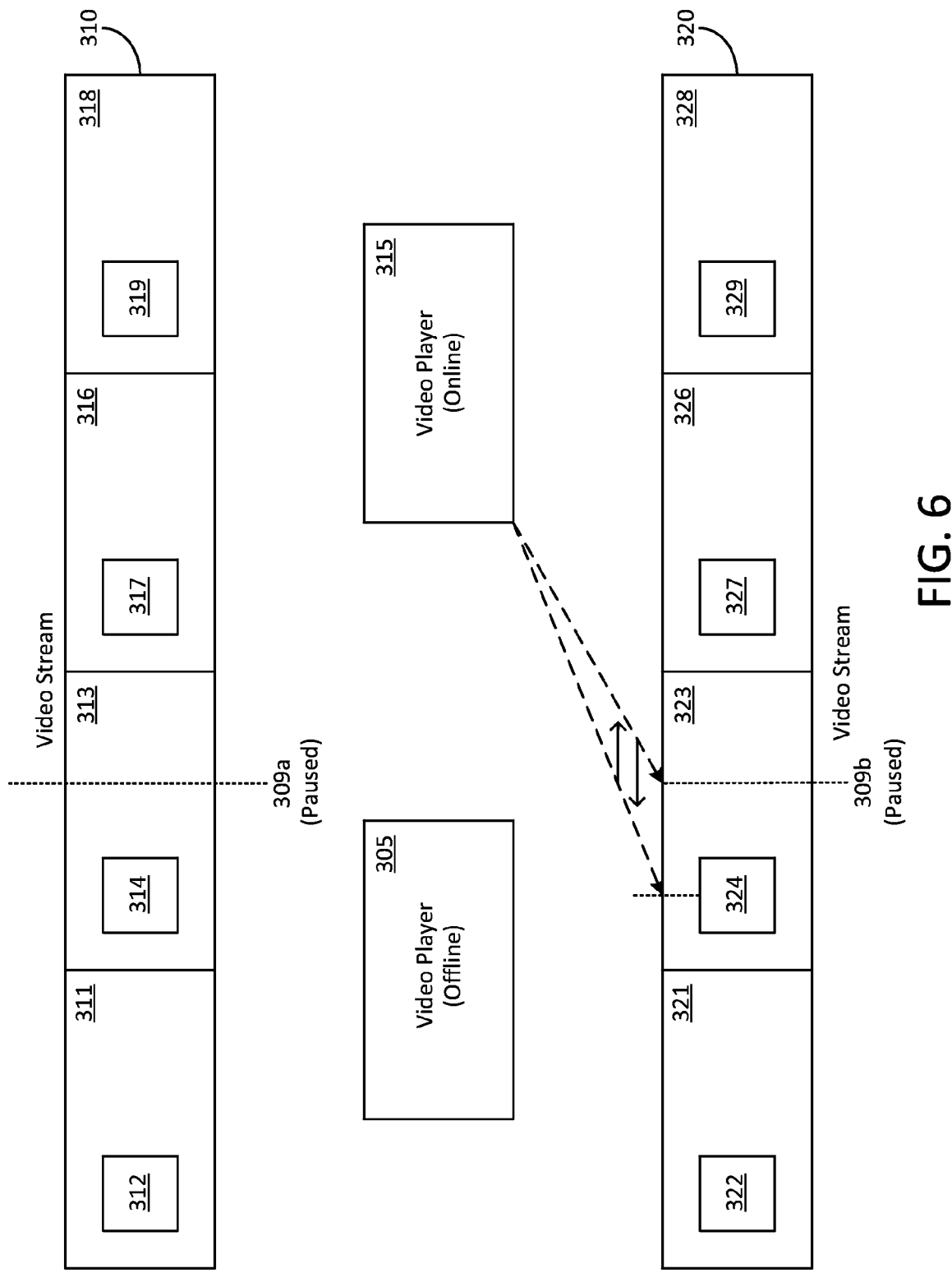

STREAMING VIDEO NAVIGATION SYSTEMS AND METHODS

CROSS REFERENCE TO RELATED APPLICATIONS

The present application claims priority to U.S. Provisional Application 61/603,341 filed on Feb. 26, 2012, entitled "Audio Video Data Switching on Past Keyframe," which is incorporated herein in its entirety by reference. The present application may also be related to U.S. Pat. No. 7,571,244 issued on Aug. 4, 2009, entitled "Audio-Video Data Switching and Viewing System", which is also incorporated by reference in its entirety.

FIELD

The present teachings generally relate to multimedia systems incorporating streaming video and audio signals. More specifically, the present disclosure relates to a multimedia system that permits rapid switching from a first video stream to a second video stream in order to present similar images at different camera angles.

BACKGROUND

It is often desired when watching streaming video of an event such as a televised football match, to navigate backwards to a specific segment of the streaming video in order to re-view a significant occurrence, such as, for example, the scoring of a goal, or a contentious decision made by a referee.

Unfortunately, existing practice for transmitting streaming video (especially over the Internet) creates a condition that hampers, or renders unfeasible, execution of a backwards navigating operation to reach the specific segment. This condition arises from the fact that existing streaming video transmission practice is directed at conserving transmission bandwidth by using a sequence of differentially compressed image frames interspersed with, what is known in the industry, as key frames (statically compressed frames that are independent of other frames). Differentially compressed image frames do not carry enough information for the video system to navigate backwards to the specific segment of the streaming video, or to switch from a first video stream to a second video stream, without the video system having to obtain access to other image frames from which the differentially compressed frame has been derived.

However, key frames do provide enough information that can be used for various purposes, including identification of one or more specific segments in a video stream, or to switch from a first video stream to a second video stream. Consequently, existing streaming video systems, upon receiving a request (via a mouse click, for example), wait for the next key frame, and use this next key frame to locate the specific segment or to execute a video stream switching operation. This waiting period introduces a noticeable amount of delay. Such a delay is highly undesirable, especially when a viewer is watching a fast-paced event such as a football match.

In addition to introducing this undesirable delay, existing streaming video systems also fail to provide a fast, convenient and user-friendly way for a viewer to initiate a request for a backwards navigating operation. Typically, in existing streaming video systems, such a request is initiated by a viewer carrying out a selection upon a text menu displayed on a viewing screen, followed by using a picture-in-picture configuration for swapping a live view displayed on the main portion of a display screen with a view displayed in a small window. The method of using such a picture-in-picture configuration adds an additional delay to that already introduced by the above-described wait for the next key frame, besides having other issues.

SUMMARY

According to a first aspect of the present disclosure, a multimedia system includes a first video buffer, a second video buffer, a multimedia processing circuit, and a communication interface. The first video buffer is configured to accept a first video stream comprising a first plurality of differentially compressed image frames and a first plurality of key frames, the first video stream generated from a first sequence of images of a real-time event perceived at a first video camera angle. The second video buffer is configured to accept a second video stream comprising a second plurality of differentially compressed image frames and a second plurality of key frames, the second video stream generated from a second sequence of images of the real-time event perceived at a second video camera angle. The multimedia processing circuit is configured to receive one of the first or the second video stream from the first or the second video buffer respectively, and transmit the received one of the first or the second video stream though a multimedia transmission link. The communication interface is configured to receive via a communications link at an arbitrary instant in time, a request to switch from the transmitted one of the first or the second video stream to the other one of the first or the second video stream, the arbitrary instant in time occurring after a first key frame has been transmitted out of the multimedia processing circuit and before a next key frame is transmitted out of the multimedia processing circuit. The first processor is configured to respond to the request by executing steps comprising: using a backwards seek procedure for identifying in the other one of the first or the second video stream, a second key frame that precedes the arbitrary instant in time; using the identified second key frame to execute a forward seek procedure for identifying in the other one of the first or the second video stream, a compressed image frame corresponding to the arbitrary instant in time; configuring the multimedia processing circuit to switch from the transmitted one of the first or the second video stream to the other one of the first or the second video stream; and configuring the multimedia processing circuit to transmit the other one of the first or the second video stream starting from the compressed image frame corresponding to the arbitrary instant in time.

According to a second aspect of the present disclosure, a method includes the following steps: storing in a first buffer, a first video stream comprising a first plurality of differentially compressed image frames and a first plurality of key frames, the first video stream generated from a first sequence of images of a real-time event perceived at a first video camera angle; storing in a second buffer, a second video stream comprising a second plurality of differentially compressed image frames and a second plurality of key frames, the second video stream generated from a second sequence of images of the real-time event perceived at a second video camera angle; receiving at an arbitrary instant in time after transmission of a first key frame and during transmission of one of the compressed image frames in the first plurality of differentially compressed image frames, a request to transmit the second video stream in place of the first video stream; using a backwards seek procedure to identify in the buffered second video stream, a second key frame that precedes the arbitrary instant in time; using the identified second key frame to execute a forward seek for identifying in the buffered second video stream, a compressed image frame corresponding to the arbitrary instant in time; and transmitting the second video stream starting from the compressed image frame corresponding to the arbitrary instant in time.

According to a third aspect of the present disclosure, a computer-readable storage medium has stored thereon, instructions that when executed by a processor implement a method comprising the steps of: storing in a first buffer, a first video stream comprising a first plurality of differentially compressed image frames and a first plurality of key frames, the first video stream generated from a first sequence of images of a real-time event perceived at a first video camera angle; storing in a second buffer, a second video stream comprising a second plurality of differentially compressed image frames and a second plurality of key frames, the second video stream generated from a second sequence of images of the real-time event perceived at a second video camera angle; detecting the receiving of a message at an arbitrary instant in time after transmission of a first key frame and during transmission of one of the compressed image frames in the first plurality of differentially compressed image frames, the message comprising a request to transmit the second video stream starting from the arbitrary instant in time; using a backwards seek procedure to identify in the buffered second video stream, a second key frame preceding the arbitrary instant in time; using the identified second key frame to execute a forward seek procedure to identify in the buffered second video stream, a compressed image frame that corresponds to the arbitrary instant in time; and transmitting the second video stream starting from the compressed image frame that corresponds to the arbitrary instant in time.

According to a fourth aspect of the present disclosure, a system includes a display and a processing circuit. The processing circuit includes a processor, and is configured to provide on the display, a virtual joystick comprising a first thumbnail display window and a second thumbnail display window. The first thumbnail display window is configured to display a first sequence of moving images of a scene as viewed at a first video camera angle. The second thumbnail display window is configured to display a second sequence of moving images of the scene as viewed at a second video camera angle, wherein each of the first and the second video camera angles displayed in the respective first and second thumbnail display windows is rendered intuitively obvious as a result of a first spatial relationship between the first and the second thumbnail display windows in the virtual joystick.

According to a fifth aspect of the present disclosure, a method includes the following steps: storing in a first video buffer of a multimedia transmitter, a first video stream comprising a first plurality of differentially compressed image frames and a first plurality of key frames, the first video stream generated from a first sequence of images of a real-time event perceived at a first video camera angle; storing in a second video buffer of the multimedia transmitter, a second video stream comprising a second plurality of differentially compressed image frames and a second plurality of key frames, the second video stream generated from a second sequence of images of the real-time event perceived at a second video camera angle; receiving in the multimedia transmitter, at an arbitrary instant in time after transmission of a first key frame and during transmission of one of the compressed image frames in the first plurality of differentially compressed image frames, a first request to replace a previously transmitted image perceived at the first video camera angle, with a corresponding image perceived at the second video camera angle, wherein the previously transmitted image has been placed in a paused state in a receiver communicatively coupled to the multimedia transmitter; using a backwards seek procedure to identify in the buffered second video stream, a second key frame that corresponds to the transmitted first key frame; using the identified second key frame to execute a forward seek procedure for identifying in the buffered second video stream, the corresponding image perceived at the second video camera angle; and transmitting to the receiver, an image frame containing the corresponding image perceived at the second video camera angle.

Further aspects of the disclosure are shown in the specification, drawings and claims of the present application.

COPYRIGHT NOTICE

A portion of the disclosure of this provisional patent application document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TRADEMARKS DISCLAIMER

The product names used in this document are for identification purposes only. All trademarks and registered trademarks are the property of their respective owners.

BRIEF DESCRIPTION OF THE DRAWINGS

The accompanying drawings, which are incorporated into and constitute a part of this specification, illustrate one or more embodiments of the present disclosure and, together with the description of a few example embodiments, serve to explain the principles and implementations of the disclosure. The components in the drawings are not necessarily drawn to scale. Instead, emphasis is placed upon clearly illustrating various principles. Moreover, in the drawings, like reference numerals designate corresponding parts throughout the several views.

FIG. 6 shows a pair of software video players and their associated video streams for describing a moviola system in accordance with the disclosure.

DETAILED DESCRIPTION

Figure 1:
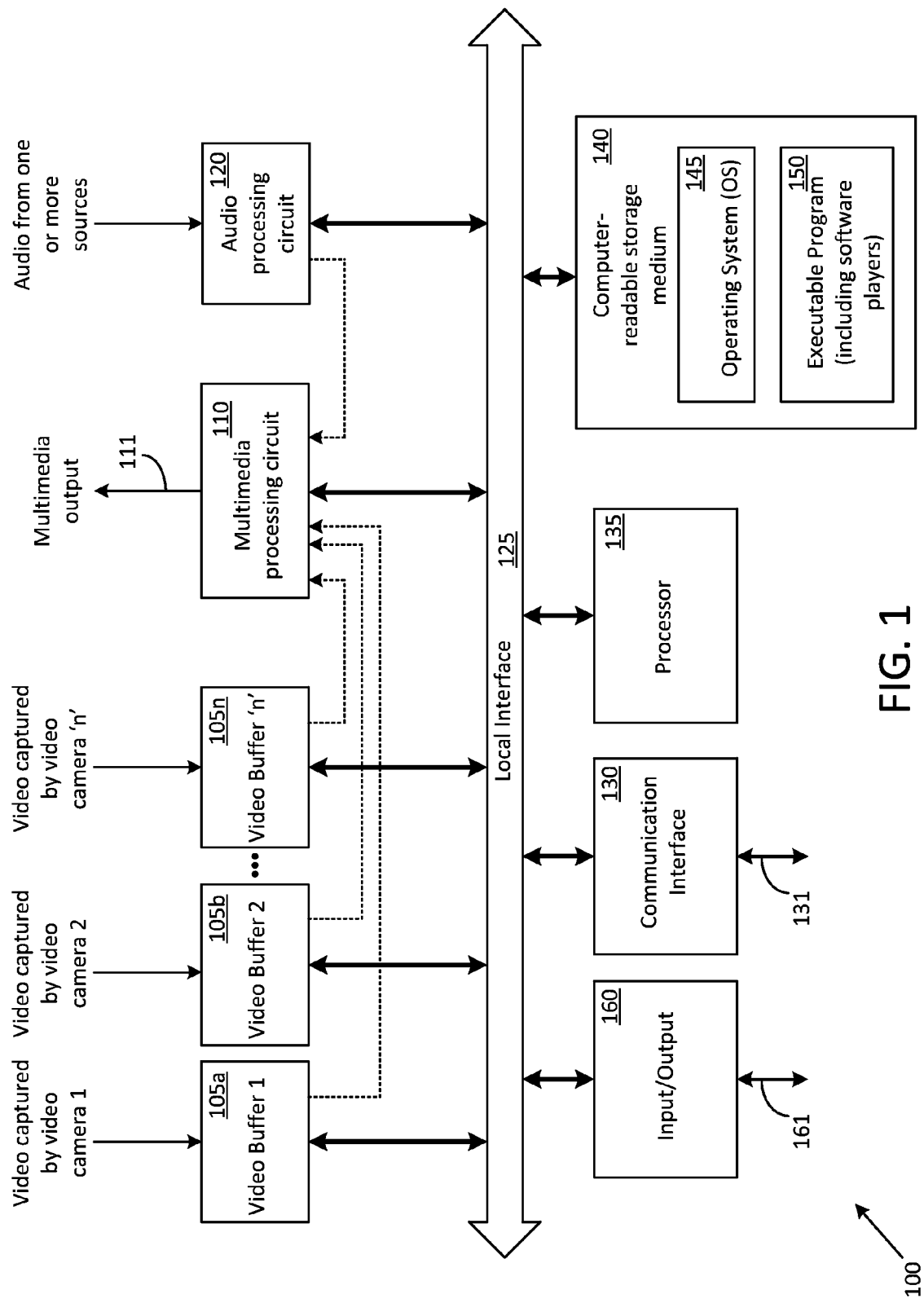
FIG. 1 shows a multimedia transmission system configured to provide video stream switching upon request, in accordance with the present disclosure.

Throughout this description, embodiments and variations are described for the purpose of illustrating uses and implementations of the inventive concept. Embodiments, however, may be embodied in many different forms and should not be construed as being limited to the few example embodiments described herein. It will be understood that the term "and/or" as used herein includes any and all combinations of one or more of the associated listed items, and that terms such as first, second, third, etc. are used herein to describe example elements, components, classes or methods. These elements, components, classes or methods should not be limited by these terms. The terms are only used to distinguish one element, component, class or method from another element, component, class or method. Consequently, a first element, component, class and/or method could be termed a second element, component, class and/or method in some instances without departing from the teachings of example embodiments.

Furthermore, unless otherwise defined, all terms (including technical and scientific terms) used herein have the same meaning as commonly understood by one of ordinary skill in the art to which preferred embodiment belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

More particularly, the various example embodiments described herein are generally directed at multimedia systems and methods that permit rapid switching from one video stream to another in order to present similar images at different camera angles. The systems and methods further describe a virtual joystick and a moviola system. The virtual joystick allows a viewer to select for viewing in a main portion of a display, a sequence of images at a different camera angle than what was previously rendered on the main portion. The different camera angle is intuitively obvious based on a spatial relationship between two or more thumbnail display windows displayed in the virtual joystick. The moviola system allows switching from a paused image having a first camera viewing angle to a second paused image having a different camera viewing angle at any arbitrary instant in time. Such a multi-angle viewing of a paused image (which is feasible as a result of the rapid switching from one video stream to a different video stream in accordance with the disclosure) is not available in existing systems, more so when the arbitrary instant in time occurs during a differentially compressed frame. Additionally, in accordance with the disclosure, the moviola system permits various navigation processes such as slow motion backwards/forwards viewing starting from the paused image after carrying out a rapid switch from the first video stream to the second video stream.

Attention is first drawn to FIG. 1, which shows an example multimedia transmission system 100 that is configured to provide switching from a first video stream to a second video stream and to propagate the second video stream from a previous instant in time, in accordance with the present disclosure. The switching is carried out upon receiving a request in communications interface 130 via communications link 131. The request may be originated from a receiver unit (not shown) that is communicatively coupled to multimedia transmission system 100 through a network (not shown) such as a local area network or a wide area network (the Internet, for example). The operation of processor 135 will be described below in more detail following the description of FIG. 2.

Multimedia transmission system 100 includes a set of "n" video buffers, each of which receives video data from external sources (not shown) such as video cameras, video signal generators, and/or video processing circuitry. Video buffer 1 (105*a*) receives video data captured by video camera 1. In one example embodiment, this video data may be raw data directly received from a video camera oriented at a certain angle for capturing video footage of a real time event. The real time event may be a football match, for example, and the video camera may be mounted on a goalpost at a southern end of a playing field. In another example embodiment, rather than receiving raw video data, video buffer 1 (105*a*) may receive video data corresponding to a computer generated image rather than raw video data. The computer generated image may be generated independent of any raw video data received from a video camera (for example, a zig-zag line showing the path of a player running from one end of the field to the other end) or may be generated on the basis of raw video data received from a video camera (for example, a wire frame figure of a player who has just scored a goal). In either of these two example embodiments, video buffer 1 (105*a*) includes circuitry that executes a compression format, which is described below in more detail. The computer generated image may also be generated by combining raw video data received from two or more video cameras that are actually capturing images of a real life event for example. In this case, this computer generated image may be perceived as being provided by a "virtual" camera.

However, in an alternative example embodiment, video buffer 1 (105*a*) may omit such circuitry, because the provided video data is already in a desirable format (a compressed format, for example). This formatted video data may be provided to video buffer 1 (105*a*) from video processing circuitry (not shown) that may be directly coupled to video buffer 1 (105*a*), or may be communicatively coupled to video buffer 1 (105*a*) via a communication link (not shown).

The configuration and operation of video buffer 2 (105*b*) and the remaining video buffers can be understood from the description provided above for video buffer 1 (105*a*). It will be understood that the nature of the video data provided to these other video buffers may be different than that provided to video buffer 1 (105*a*). For example, video buffer 2 (105*b*) may be configured to receive video data generated by another video camera oriented at a different angle for capturing video footage of the real time event (for example, a video camera mounted on a tripod along a side line of the playing field).

The multi-media output on transmission link 111 may be referred to herein in certain instances as "video feed," "video file," "audio feed," and/or an "audio file." These feeds may not necessarily be provided via the video buffers 105*a* and 105*b*, but may instead be provided by other means, and encoded using circuitry (not shown). Portions of such video and audio streams may be stored in the form of video and/or audio files, in certain embodiments. As can be understood from certain descriptions provided herein, a single audio stream may be combined with multiple video streams each of which provide a different camera angle. However, multiple audio streams may be also combined with a single video stream or multiple video streams. The switching operations in accordance with the disclosure include implementations wherein switching is carried out between two or more video streams while associated one or more audio files are seamlessly streamed, as well as implementations wherein switching is carried out between two or more audio streams while associated one or more video files are seamlessly streamed.

Elaborating upon the desirable compressed format referred to above, in one example embodiment, the video data is provided in the form of a sequence of video frames, which is generally referred to herein by various terms such as streaming video, video stream, streaming multimedia etc. Typically, a video stream includes a number of differentially compressed video frames, interspersed with certain video frames that are statically compressed (i.e. without using other frames) generally known in the art as key frames, or intra-frames. Differential compression is known in the art and will not be extensively elaborated upon herein in the interests of avoiding any distraction from the primary aspects of the disclosure. Furthermore, it should be understood that even though the example embodiments described below are directed at video streams incorporating differential compression, the systems and methods disclosed herein are equally pertinent and applicable to other forms of data compression as well.

To briefly describe differential compression, as is known, a video frame may be statically compressed using one of several static image compression techniques, or may be dynamically compressed using one of several dynamic image compression techniques. Among the dynamic image compression techniques, differential compression involves using one or more contiguous video data frames to generate a current video data frame. As a result of this differential process, it is undesirable to arbitrarily execute a switching operation from a first video stream to a second video stream during transmission of a compressed video data frame because such a switch may result in degradation of one or more regenerated images at a receiving end of the transmission. Primarily, the degradation is due to problems encountered in reconstructing an accurate image using just the compressed video data frame at which the switch has occurred without obtaining additional information from other image frames associated with the compressed video data frame.

This issue is addressed to some degree by the use of the interspersed video frames carrying comprehensive image information. As indicated above, these video frames are known in the art by various terms such as "key frames" or "static frames." Key frame generation typically follows both deterministic rules (for example, by generating a key frame every "n" frames, say 1 key frame every 8 frames) and adaptive rules (for example, by generating a key frame each time the encoder detects a sudden change in the video content). Deterministic rules avoid drifts in video quality caused by accumulation of small losses of video details through successive differential compressions. Adaptive rules avoid instantaneous degradation of video quality caused by intrinsic limits of differential encoding in presence of sudden changes in video content from one frame to the following. Key frame generation techniques, which depend on the encoder and the video source, are known in the art and will therefore, not be described herein in extensive detail. Key frames are used, for example, to seek specific image frames whenever DVR-type of functionalities (such as forwards or backwards seeks) are desired in a streaming video session, or in adaptive streaming technologies that use switching points among different video streams having different bandwidths.

Drawing attention back to FIG. 1, one or more of video buffers 1 through "n" may be coupled into multi-media processing circuit 110, either in a static connection format or in a dynamic connection format. In the dynamic connection format, one or more of video buffers 1 through "n" are provided a control signal by processor 135 via local interface 125 and the corresponding video data from the one or more of video buffers 1 through "n" is coupled into multi-media processing circuit 110.

Multi-media processing circuit 110 may include various elements (not shown), including, for example, one or more video signal drivers that drive the video data into transmission link 111 in a video streaming format, and one or more display memories/buffers. In various embodiments, transmission link 111 may be implemented using any of a wide variety of technologies and hardware such as, for example, wired, wireless, or optical technologies and associated hardware. As for the display memories/buffers, in contrast to video buffers 1 through "n" which temporarily hold video data that may or may not be coupled into multi-media processing circuit 110, the display memories contained in multi-media processing circuit 110 may be used to temporarily buffer video data that is actually propagated out of multi-media processing circuit 110 via transmission link 111. In some embodiments, the display memories may be used for various types of processing functions in addition to buffering.

Audio from one or more sources (for example from the one or more video cameras associated with video buffers 1 through "n") is coupled, either directly or through a network, into audio processing circuit 120. This audio is coupled into multi-media processing circuit 110 either statically or dynamically (under control of processor 135 via local interface 125).

In one example embodiment described below in more detail, audio provided from a first video camera remains coupled into multi-media processing circuit 110 so as to provide uninterrupted audio transmission out of multi-media processing circuit 110 (as part of the multi-media output on transmission link 111) even when a switching operation is executed in order to replace the currently carried video data on transmission link 111 (for example, the video data provided by video buffer 1 (105a)) with video data provided by a different video buffer (for example, video buffer 2 (105b)). The switching operation will be described below in further detail using other figures.

Figure 2:
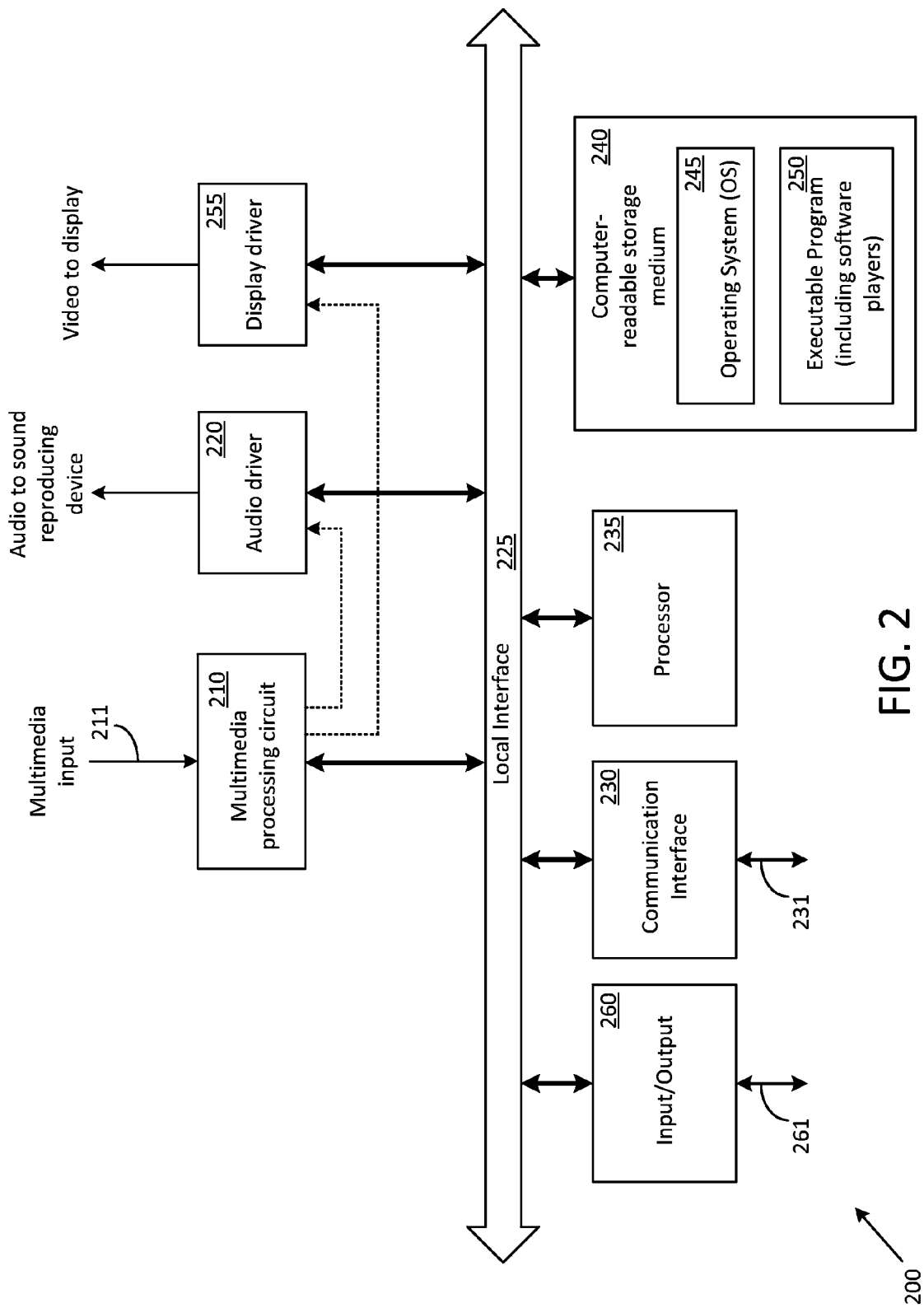
FIG. 2 shows a multimedia receiving system configured to initiate the request to the multimedia transmission system shown in FIG. 1, in accordance with the present disclosure.

Attention is now drawn to FIG. 2, which shows a multimedia receiving system 200 configured in accordance with the disclosure. In various embodiments, communication link 231 of multimedia receiving system 200 may be coupled to communication link 131 of multimedia transmission system 100 via a network, or may be a direct (non-networked) connection. Either way, multimedia receiving system 200 uses communication link 231 to propagate the request that is provided to communications interface 130 of multimedia transmission system 100.

Similarly, in various embodiments, transmission link 211 of multimedia receiving system 200 may be coupled to transmission link 111 of multimedia transmission system 100 via a network, or may be a direct (non-networked) connection. Either way, multimedia receiving system 200 uses transmission link 211 to receive the video stream propagated out of multimedia transmission system 100 via transmission link 111.

Upon receiving the video stream, multi-media processing circuit 210 performs various operations, such as decoding/decompression and routes the audio portion of the received multi-media input to audio driver 220 which drives suitable audio reproduction circuitry such as one or more loudspeakers. The video portion, which may be in the form of a baseband video signal, is provided to display driver 255, which in turn drives a suitable display system (not shown) for viewing by one or more viewers. A viewer may initiate a video stream switch request via the display system. This request may be carried out via various mechanisms including clickable menu screens and touch screen options. Some of these mechanisms, such as a virtual joystick and a moviola system, are described below using other figures.

When the video stream switch request is initiated by a viewer, processor 235 recognizes the action and transmits a request in a suitable format, out of communication link 231 to multimedia transmission system 100.

In one example embodiment, multimedia receiving system 200 is a client device that is coupled to multimedia transmission system 100, which is configured as a server device for providing services to one or more client devices such as multimedia receiving system 200. Some non-limiting examples of client devices include a digital video recorder (DVR), a set top receiver (satellite, cable etc.), and a television set; while some non-limiting examples of server devices include devices used by a service provider (satellite, cable etc.), a recording studio, or an on-site real-time broadcaster.

The operation of the processors and various other elements that may be included in multimedia receiving system 200 (shown in FIG. 2) and/or multimedia transmission system 100 (shown in FIG. 1) will now be explained in a general way (using FIG. 2 for convenience, wherein the reference numerals "2xx" bear resemblance to the reference numerals "1xx" used in FIG. 1) so as to provide an understanding of the operation and the nature of these various elements.

Firstly, it will be understood that the various components, elements and functional blocks described in this disclosure can be implemented in software, firmware, hardware, or a combination thereof. When all or portions of the system are implemented in software, for example as an executable program, the software may be executed by a general purpose computer (such as, for example, a personal computer that is used to run a variety of applications), a specialized computer (such as a server), or by various other devices that are specifically configured for implementing the features described herein. When implemented in hardware, the hardware may be incorporated into a single enclosure or may be incorporated into multiple units that may or may not be co-located at a single location. Distributed hardware and software configurations associated with the Internet are known in the art and in the interests of brevity will not be elaborated upon herein.

The functional elements shown in FIG. 2 include processor 235, computer-readable storage medium 240 (referred to hereon for convenience, as "memory 240") memory 240, communication interface 230, and one or more input and/or output (I/O) devices (not shown). These elements are communicatively coupled to each other via a local interface 225. The local interface 225 can be, for example, metal tracks on a printed circuit board, or any other forms of wired, wireless, and/or optical connection media. Furthermore, the local interface 225 is a symbolic representation of several elements such as controllers, buffers (caches), drivers, repeaters, and receivers that are generally directed at providing address, control, and/or data connections between multiple elements.

The processor 235 is a hardware device for executing software, more particularly, software stored in memory 240. The processor 235 can be any commercially available processor or a custom-built device. Examples of suitable commercially available microprocessors include processors manufactured by companies such as Intel, AMD, and Motorola.

The memory 240 can include any type of one or more volatile memory elements (e.g., random access memory (RAM, such as DRAM, SRAM, SDRAM, etc.)) and nonvolatile memory elements (e.g., ROM, hard drive, tape, CDROM, etc.). The memory elements may incorporate electronic, magnetic, optical, and/or other types of storage technology. It must be understood that the memory 240 can be implemented as a single device or as a number of devices arranged in a distributed structure, wherein various memory components are situated remote from one another, but each accessible, directly or indirectly, by the processor 235.

The software in memory 240 may include one or more separate programs, each of which comprises an ordered listing of executable instructions for implementing logical functions. In the example of FIG. 2, the software in the memory 240 includes an executable program 250 that can be executed to implement one or more elements in accordance with the present invention. Memory 240 further includes a suitable operating system (OS) 245. The OS 245 can be an operating system that is used in various types of commercially-available devices such as, for example, a personal computer running a Windows® OS, an Apple® product running an Apple-related OS, or an Android OS running in a smart phone. The operating system 245 essentially controls the execution of executable program 250 and also the execution of other computer programs, such as those providing scheduling, input-output control, file and data management, memory management, and communication control and related services.

Executable program 250 is a source program, executable program (object code), script, or any other entity comprising a set of instructions to be executed in order to perform a functionality. When a source program, then the program may be translated via a compiler, assembler, interpreter, or the like, and may or may not also be included within the memory 240, so as to operate properly in connection with the OS 245. In certain embodiments of the disclosure, executable program 250 is created and/or implemented using commercially available tools, such as disclosed in the AV Foundation Framework provided by Apple Inc.®. A few examples of modules and nomenclature associated with software development tools provided by Apple Inc.® are indicated herein.

The I/O devices (not shown) may include input devices, for example but not limited to, a keyboard, mouse, scanner, microphone, etc. Furthermore, the I/O devices may also include output devices, such as the display referred to above.

The software in the memory 240 may further include a basic input output system (BIOS) (omitted for simplicity). The BIOS is a set of essential software routines that initialize and test hardware at startup, start the OS 245, and support the transfer of data among various hardware devices. The BIOS is stored in ROM so that the BIOS can be executed upon power up.

When in operation, the processor 235 is configured to execute software stored within the memory 240, to communicate data to and from the memory 240, and to generally control operations pursuant to the software. The software stored within the memory 240, in whole or in part, but typically the latter, is read by the processor 235, perhaps buffered within the processor 235, and then executed.

When implemented in software, as is shown in FIG. 2, it should be noted that the software can be stored on any computer readable storage medium for use by, or in connection with, any computer related system or method. In the context of this document, a computer readable storage medium is an electronic, magnetic, optical, or other physical device or means that can contain or store a computer program for use by, or in connection with, a computer related system or method.

The software can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store, communicate, propagate, or transport the program for use by or in connection with the instruction execution system, apparatus, or device. The computer readable storage medium can be, for example but not limited to, an electronic, magnetic, optical, electromagnetic, infrared, or semiconductor system, apparatus, or device. More specific examples (a non-exhaustive list) of the computer-readable storage medium would include the following: a portable computer diskette, a random access memory (RAM), a read-only memory (ROM), an erasable programmable read-only memory (EPROM, EEPROM, or Flash memory) an optical disk such as a DVD or a CD.

In an alternative embodiment, where one or more of the elements described herein are implemented in hardware, the hardware can include any one, or a combination, of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc Attention is next drawn to FIGS. 3A through 3D, which show a pair of software video players and their associated video streams for describing a switching operation in accordance with the disclosure. Software video players 305 and 315 are incorporated into multimedia transmission system 100 and are instantiated using various software constructs such as classes and objects. In some embodiments described herein various such software constructs are based upon, or derived from, data provided in derived from AV Foundation Framework provided by Apple Inc.®. For example, each of software video players 305 and 315 may be managed by a class referred to as "VideoFeed." More particularly, the controls and user interface of software video players 305 and 315 may be implemented using the "VideoFeed" to create one or more instances of objects of the class "AVPlayer," and a property name "povPlayer." Various other classes that may be used for implementing certain functions in the various embodiments are described further below in some detail.

At this time, attention is drawn to video player 305, which is in an online mode of operation wherein a video stream, for example, video stream 310 that is available from video buffer 1 (105a), is currently propagated out of multi-media processing circuit 110 into transmission link 111. Video stream 310 contains multiple compressed frames and key frames. The multiple compressed frames and key frames are shown configured as segments (311, 313, 316 and 318) that may be generally referred to herein as a "group of pictures" (GOP) each having a certain duration that may or may not be equal to each other. GOP 311 includes a key frame 312, while the other GOPs also include respective key frames (314, 317, and 319).

Video player 315 is in an offline mode of operation wherein another video stream, for example, video stream 320 that is available from video buffer 2 (105b), is serviced by video player 315 but not currently propagated out of multi-media processing circuit 110 into transmission link 111. Similar to video stream 310, video stream 320 also contains multiple compressed frames and key frames, which are shown configured as segments (321, 323, 326 and 328) (GOPs) each having a certain duration that may or may not be equal to each other. GOP 321 includes a key frame 322, while the other GOPs in video stream 320 also include respective key frames (324, 327, and 329).

Figure 3A:
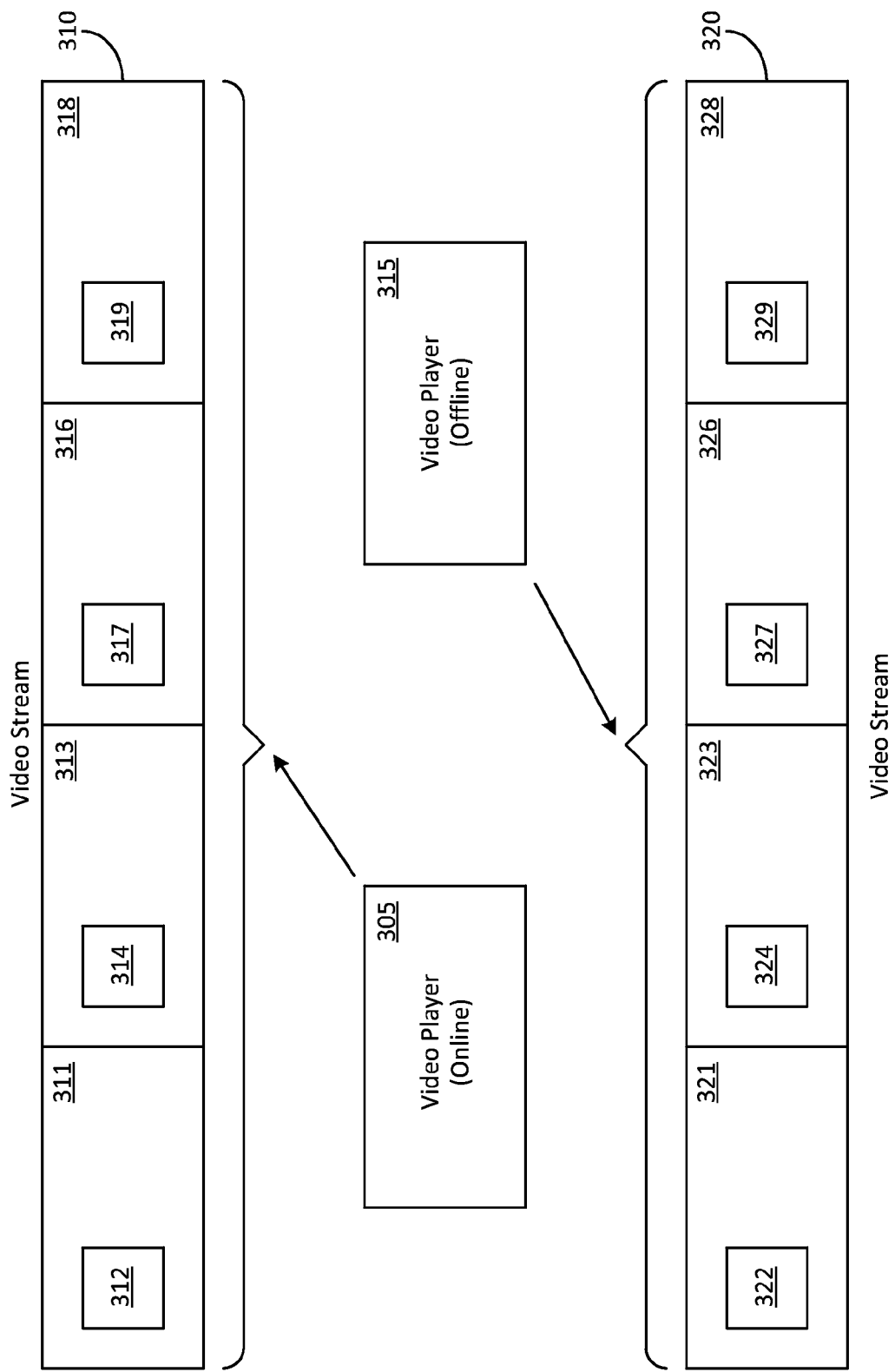
FIGS. 3A through 3D show a pair of software video players and their associated video streams for describing a switching operation in accordance with the disclosure.
Figure 3B:
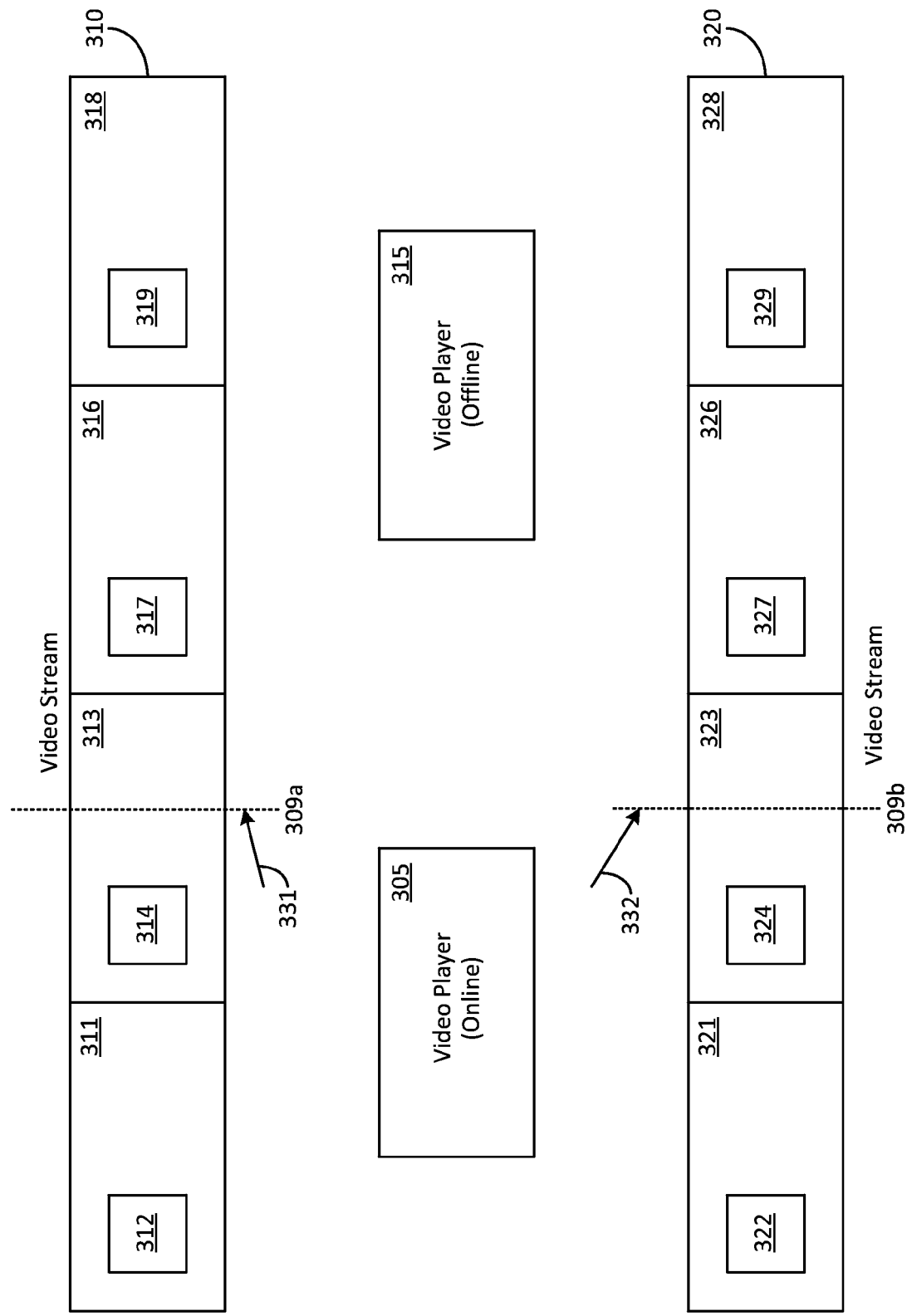
Figure 3C:
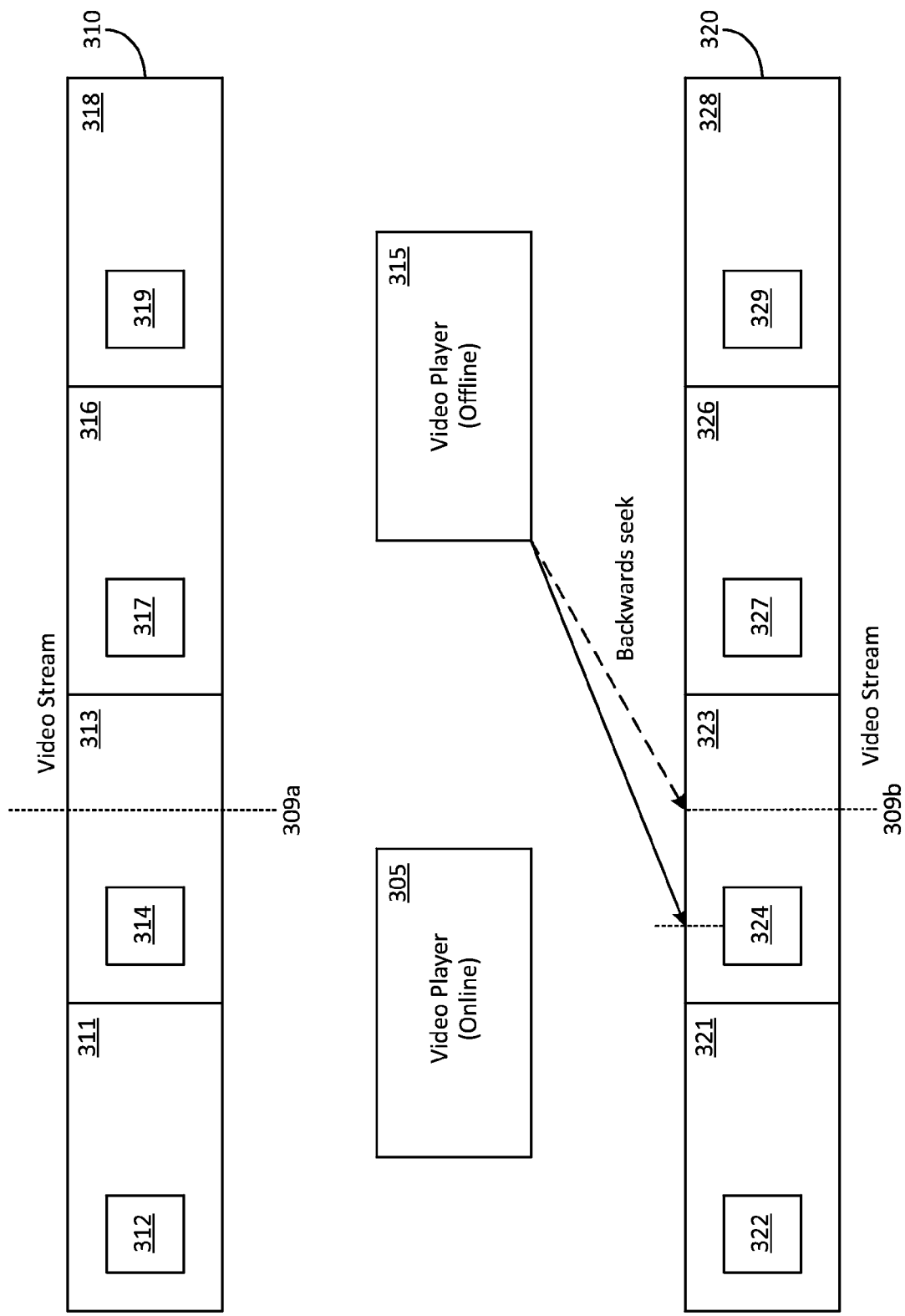
Figure 3D:
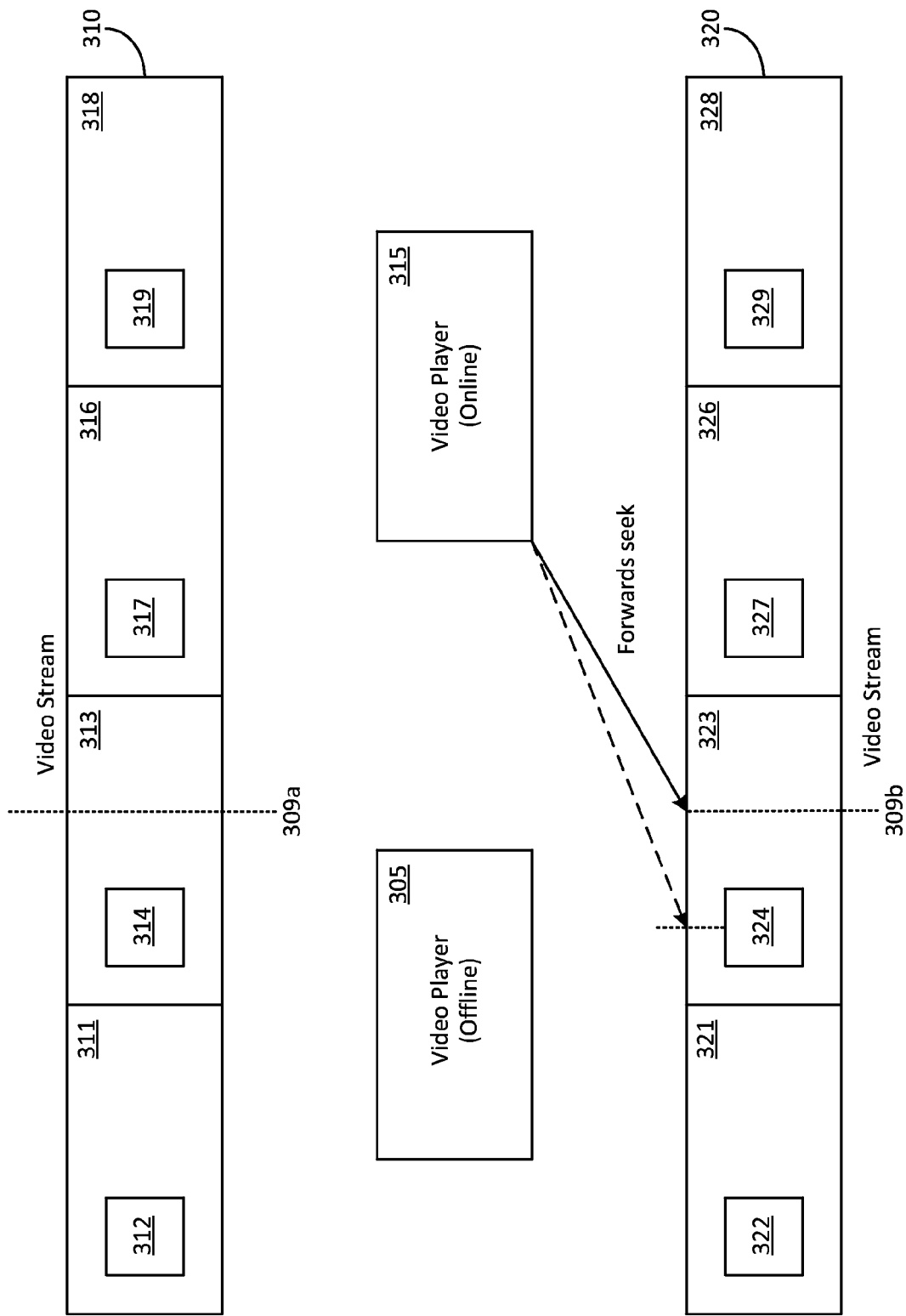

Attention is now drawn to FIG. 3B, which shows an arrow 331 indicative of a request that is received at an arbitrary instant in time in multimedia transmission system 100 from multimedia receiving system 200 as described above. The arbitrary instant in time corresponds to a location 309a during which a compressed image frame has been transmitted out of multimedia transmission system 100 and has been received in multimedia receiving system 200. This compressed image frame, which is received in multimedia receiving system 200 after receipt of key frame 314 but prior to receiving of key frame 317, may relate to any particular occurrence during streaming of a real time event via video stream 310. Video stream 320 could also be virtually available to video buffer 2 (105b) in the form of a manifest file, containing all the reachability information, that has been published on a server and downloaded over a network for acknowledgement by executable program 150, and stored for later use. In this configuration second video stream 320 will be available for in an offline mode, without consuming any transmission bandwidth, while the first video stream is in an online mode for displaying in a main portion of a display.

For example, the compressed image frame at location 309a of video stream 310 may correspond to a contentious decision having been made by a referee. A viewer who is watching video stream 310 displayed upon the display coupled to multimedia receiving system 200 may be interested in viewing from one or more different angles, one or more images of the game action that triggered the contentious decision. In order to do this, the viewer may request a switch to another video stream (such as video stream 320) in order to change a viewing angle. As can be understood, such a request can occur at any arbitrary instant in time because one would be unable to predict when exactly a viewer may choose to pause and request a switch to a different video stream. The request may occur right after the viewer has viewed a certain portion of received video stream 310 or may occur after a significant delay following the portion of received video stream 310.

Notwithstanding the unpredictability of the timing of the request, when the request is received in multimedia transmission system 100, video player 315 that is in the offline mode of operation responds to the request by initiating a seek procedure to locate a compressed image frame at location 309b (indicated by arrow 332) of video stream 320. Location 309b in video stream 320 corresponds to location 309a in video stream 310. In other words, location 309b has a compressed image corresponding to location 309a, but at a different camera viewing angle.

The seek procedure in accordance with the disclosure eliminates an undesirable prior art time delay when carrying out the switching. This undesirable prior art time delay occurs as a result of prior art practice wherein a waiting period is introduced in order to receive the next key frame.

In contrast to this prior art practice, the seek procedure in accordance with the disclosure is carried out in two parts. The first part includes a backwards seek procedure (shown in FIG. 3C) wherein video player 315 performs a backwards seek operation in order to locate key frame 324. Because key frame 324 has already been transmitted and is already available for access by video player 315, the undesirable prior art delay in waiting for next key frame 327 is eliminated. Significantly, the seek procedure in accordance with the disclosure permits switching to be carried out instantaneously in a next available frame, assuming availability of sufficient processing capacity.

Locating of key frame 324 may be carried out in several ways. In one example procedure, video streams 310 and 320 streamed in a manner that causes each of the key frames in video stream 310 to be substantially aligned to each of the corresponding key frames in video stream 320. The alignment may be carried out by visual observation for example, or by the manner by which the compression encoders in two cameras generate the two video streams in a synchronized format (for example, to provide segments of equal durations, unequal durations, specified durations, random durations etc). In certain implementations, a time code may be used to locate key frame 324. The time code may be stored as a software variable in one or both video players 305 and 315. The software variable may be incremented each time a key frame is transmitted. For example, when each of the first and the second compressed video streams has a frame rate of 25 fps (frames per second), a single frame will have a display time on a main window of $\frac{1}{25}$ second (0.04 second). Given sufficient bandwidth and processing power, switching from one video stream to the other video stream in accordance with the disclosure, will cause one image at a first camera angle to be swapped to another image having a different camera angle without any noticeable visually perceptible delay.

Locating of key frame 324 may be also carried out without alignment between the key frames in video streams 310 and 320 because some streaming protocols incorporate information pertaining to the key codes. For example the "HTTP Live Streaming" protocol of Apple® provides the following code: "In a Playlist with the EXT-X-I-FRAMES-ONLY tag, the media segment duration (EXTINF tag value) is the time between the presentation time of the I-frame in the media segment and the presentation time of the next I-frame in the Playlist, or the end of the presentation if it is the last I-frame in the Playlist." As a result, the location of key frame 324 may be determined by referencing a table containing all the time codes of all the available key frames in a video stream.

In another way of locating key frame 324, metadata carried in a video stream may be used. Such metadata is used in various commercial products made by companies such as Adobe® (i.e. HTTP Dynamic Streaming, also used in Flashplayer).

In yet another way of locating key frame 324, a reference time code embedded inside an audio track of the audio portion corresponding to at least one of video stream 315 or 310 may be used. In some other implementations, the time codes may be provided via a hardware device (coupled to, or built into, to multimedia transmission system 100).

Once the previously transmitted key frame 324 is located by video player 315, the information contained therein is used to initiate a forward seek procedure (shown in FIG. 3D) for determining location 309b in video stream 320. Once location 309b has been determined, a switching operation is performed whereby video player 305 is changed from the online mode of operation to the offline mode of operation, and video player 315 is changed from the online mode of operation to the offline mode of operation. It will be understood that the switching operation not only involves actions carried out by each of video players 305 and 315, but also involves other hardware and software activities for routing video stream 320 out of multi-media processing circuit 110 in multimedia transmission system 100, and into transmission link 111.

More significantly, when video player 315 is placed in the online mode of operation, video stream 320 is transmitted out of multimedia transmission system 100 from location 309b onwards, thereby allowing the viewer to view the requested image at a camera viewing angle that is different than that which is associated with the image at location 309a in video stream 310.

In one example implementation, when video player 315 is placed in the online mode of operation, the audio portion that is associated with video stream 310 is continuously streamed out of multimedia transmission system 100 without interruption. As a result, the viewer who initiated the request to switch video streams can continue to listen to the audio soundtrack of a football game, for example, while watching the image at location 309b in video stream 315 in place of the image at location 309a in video stream 310.

However, in another example implementation, when video player 315 is placed in the online mode of operation, the audio portion that is associated with video stream 310 is also switched out and replaced with an audio portion that is associated with video stream 315.

Figure 4:
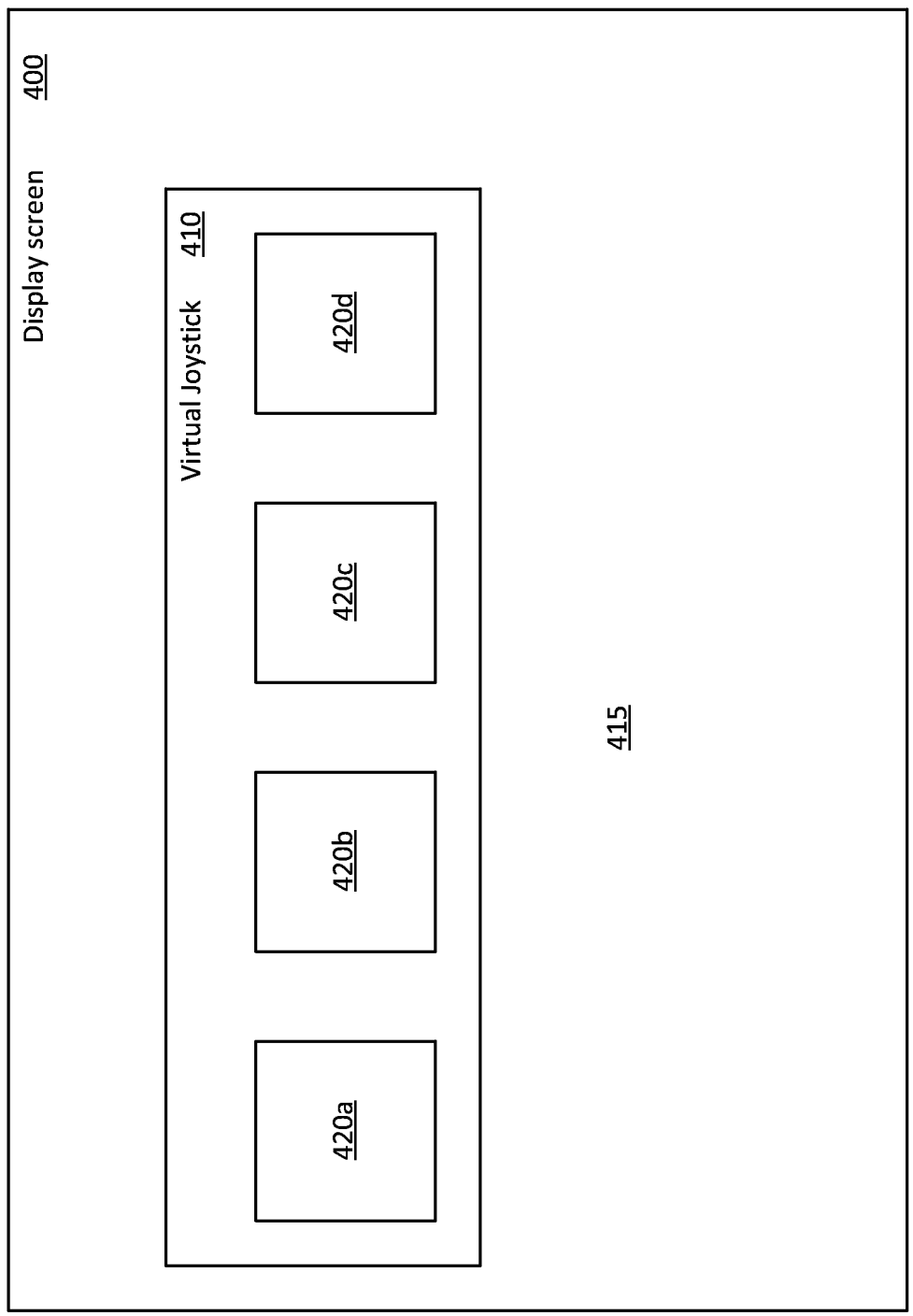
FIG. 4 shows a first example embodiment of a virtual joystick in accordance with the disclosure.

Attention is next drawn to FIG. 4, which shows a first example embodiment of a virtual joystick 410 that is displayed in one portion of a display screen 415 in accordance with the disclosure. Display screen 415 may be a part of multimedia receiving system 200, and more particularly, may be coupled to display driver 255 shown in FIG. 2.

Virtual joystick 410 is basically a visual interface that simulates a physical joystick. Virtual joystick 410, which may be continuously displayed upon a screen or displayed only upon request by a human viewer, includes one or more thumbnail display windows, five of which (420a-d) are shown in this example embodiment. Each of the thumbnail display windows 420a-d display one or more images, wherein the one or more images are displayed at a camera viewing angle that is different than that associated with one or more images displayed on a main portion 415 of display screen 400 outside the portion occupied by virtual joystick 410.

Furthermore, each of thumbnail display windows 420a-d may display one or more images at camera angles that are different from one another. For example, thumbnail display windows 420a may display one or more images as viewed from a goalpost located at a north end of a football field, while thumbnail display windows 420b may display one or more images as viewed from a sideline of the same football field.

The content and the positions of each of thumbnail display windows 420a-d may be dynamically updated based on various factors, such as, for example, information obtained when one or more of the video cameras capturing images of a real-time event are moved. This information may include 2-dimensional or 3-dimensional positional coordinates of a video camera (independent of other video cameras, and/or relative to one or more other video cameras).

When display 400 is a touchscreen display, each of thumbnail display windows 420a-d may be touchscreen activated. Consequently, various touchscreen related operations such as swiping, dragging and dropping, pinching and expanding can be carried out upon each individual thumbnail display window independent of other thumbnail display windows, or can be carried out upon one or the thumbnail display windows 420a-d relative to another.

The example embodiment shown in FIG. 4, shows thumbnail display windows 420a-d arranged in what is referred to herein as a striped arrangement. It will be understood that the striped arrangement shown in FIG. 4 is a horizontal striped arrangement. However, in other embodiments, the striped arrangement may be oriented in various directions in lieu of or in addition to the horizontal direction.

Figure 5:
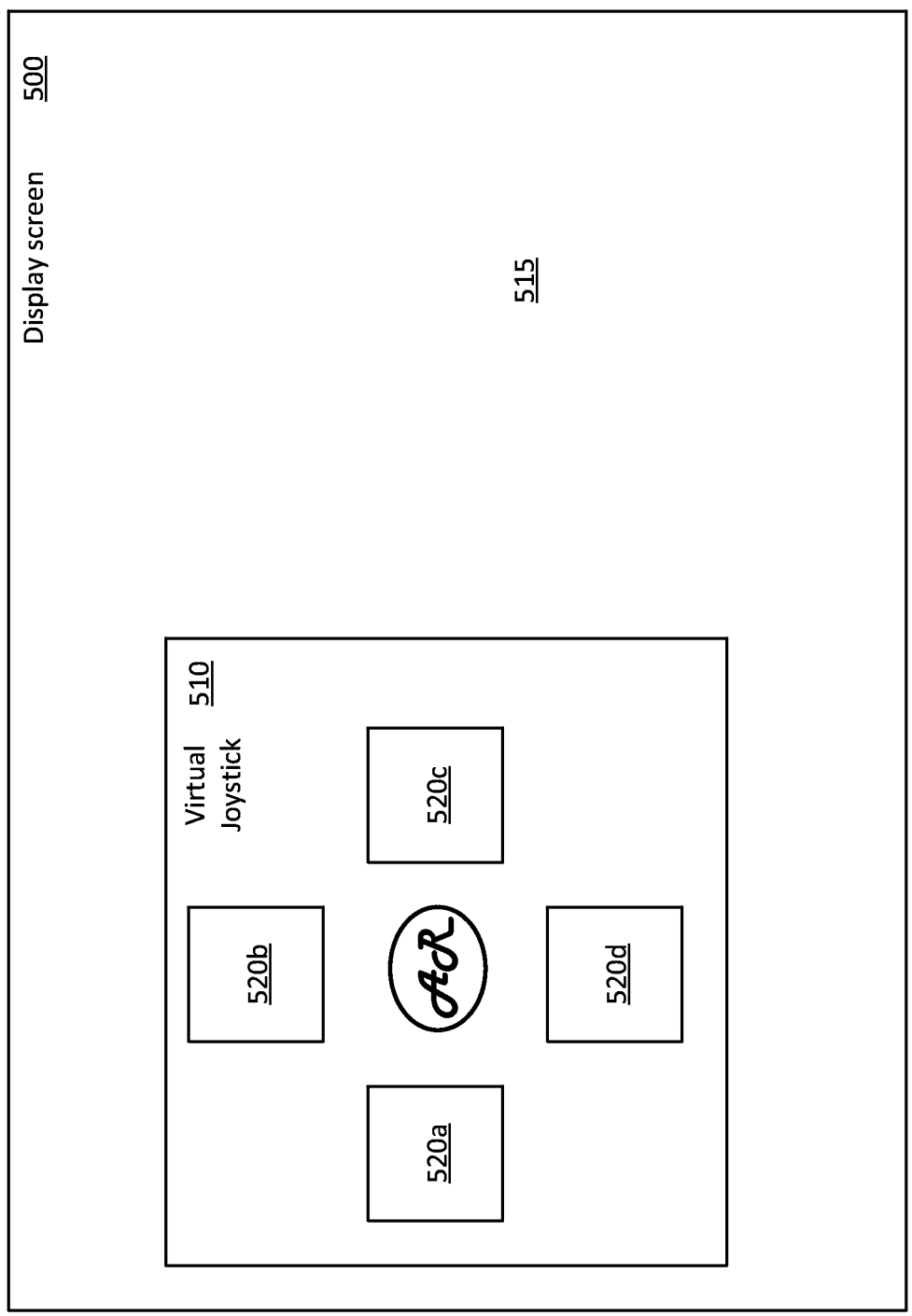
FIG. 5 shows a second example embodiment of a virtual joystick in accordance with the disclosure.

Attention is now drawn to FIG. 5, which shows a second example embodiment of a virtual joystick in accordance with the disclosure. In this embodiment, thumbnail display windows 520a-d are displayed in the virtual joystick 510 in a spatial arrangement that includes a central area wherein any suitable image, such as a logo, may be placed. The intrinsic and operational characteristics of thumbnail display windows 520a-d can be understood from the description provided above with respect to thumbnail display windows 420a-d. It will be understood that in the example embodiment shown in FIG. 5, only four thumbnail display windows 520a-d are indicated, which accommodate a finger swiping action in four different directions for viewing four different camera angle (in addition to the camera angle shown in the main portion of the display). However, in other embodiments, more or less than four thumbnail display windows may be used.

As can be seen in FIG. 5, thumbnail display windows 520a-d are spatially arranged in peripheral locations around this central area. In the particular example embodiment shown in this figure, thumbnail display windows 520a-d are arranged in a compass-oriented arrangement, which in this example is a north-south-east-west oriented arrangement.

Significantly, this spatial arrangement thumbnail provides to the viewer an intuitive understanding of the various camera angles. When the viewer activates a particular thumbnail display window, say thumbnail display window 520*b* by touching an area of a touch screen display in which thumbnail display window 520*b* is located, the video stream displayed in the main portion 515 of display screen 500 outside the portion occupied by virtual joystick 510, is replaced by the video stream displayed in thumbnail display window 520*b*. The switching operation is carried out using the seek procedure described above using FIGS. 3A-D.

In one example implementation, upon completion of the switching operation, the video stream displayed in thumbnail display window 520*b* is replaced by the video stream that was previously displayed in the main portion 515 of display screen 500. In other words, the video streams appearing in thumbnail display window 520*b* and the main portion 515 are swapped.

Furthermore, after the swapping of video streams between thumbnail display window 520*b* and main portion 515 is completed, in certain embodiments, the thumbnail display windows 520*a-d* may be automatically repositioned inside virtual joystick 510 such that the various camera angles are rendered intuitively obvious once again.

In another example implementation, a video stream appearing in one thumbnail display window, say thumbnail display windows 520*a*, may be swapped with a different video stream appearing in a different thumbnail display window, say thumbnail display windows 520*c*. This swapping operation may be carried out manually or automatically for a variety of reasons, such as for example, based on a viewer preference or a modification in the nature of the video stream (a new camera viewing angle, for example) displayed in one or more of windows 510*a-d*.

Attention is next drawn to FIG. 6, which shows a pair of software video players 305 and 315 and their associated video streams 310 and 320 for describing a moviola system in accordance with the disclosure. FIG. 6 is substantially a replica of FIG. 3D and consequently pertains to a condition wherein the actions described above with reference to FIGS. 3A-C have been completed. However, in contrast to the operation described above with reference to FIG. 3D, wherein video player 310 is switched out (placed in the offline mode of operation) and video player 315 is placed in the online mode of operation, followed by transmission of video stream 320 out of multimedia transmission system 100 from location 309*b* onwards, in the operation associated with FIG. 6, after video player 315 is placed in the online mode of operation, only a paused image corresponding to location 309*b* is transmitted out of multimedia transmission system 100 and displayed as a paused image in a display screen that may be coupled to multimedia receiving system 200 (shown in FIG. 2). As can be understood, when a viewer initiates a request to replace a first paused image with a second paused image in order to view the paused image at a different camera viewing angle, the request may occur at any arbitrary instant, for example when a differentially compressed image is present. The rapid backwards and forwards seek procedure in accordance with the disclosure, allows a rapid reconstruction of a complete image from the differentially compressed image that is present at location 309*b*. A prior art system would be unable to use the partial image information obtained from the differentially compressed image at location 309*b*.

The viewer who made the request to switch from video stream 315 to video stream 320 in order to view a paused image at a different camera viewing angle, now has the option to carry out various digital video recorder (DVR) style operations incorporating more advantageous features than those available in existing art.

Particularly, in existing art, a paused image having a first camera viewing angle cannot be swapped with another paused image having a different camera viewing angle without addressing and overcoming the problem of switching on a differentially compressed frame. Furthermore, if the viewer desires to perform operations such as a slow-motion-backwards-play operation from a paused condition, in prior art approaches, the pause condition has to be aborted, followed by a next key frame location determination and a rewind operation to locate a key particular frame of interest to the viewer. In addition to the delay, this process also creates certain issues related to updating the time code in one or both video streams.

In contrast, in accordance with this disclosure, the viewer can perform a number of gestural actions using a user-friendly gestural interface and without suffering significant delay in obtaining results. A few non-limiting example of gestural actions include a frame-by-frame forward-play operation, a frame-by-frame backwards-play operation, a slow-motion forward-play operation, a slow-motion backwards-play operation. As for the user-friendly interface, the various gestural actions can be carried out upon a touch screen display using touch-screen related gestures such as, for example, using one or more fingers for swiping, dragging and dropping, rotating, pinching, and/or expanding on an image. The gestural actions for operating the moviola further include finger-related actions for changing the speed of the displayed video stream (for example, flicking a finger in one of two opposing directions to slow down, or to speed up, the video stream). The gestural actions may be carried out using the virtual joystick described above, or can be carried out upon a main image displayed on a major portion of a display screen. More generally speaking, gestural actions can be captured by any manner or device that is available in the industry, now or in the future. Nowadays yet another convenient way of capturing said gestural action can be the utilization of a motion sensing input device such as the Kinect of Microsoft®.

Significantly, the moviola system in accordance with the disclosure, not only addresses the prior art disadvantages related to switching at a differentially compressed image frame from one video stream to a different video stream but also permits the various gestural actions (swiping, pinching etc.) to be carried out upon a first paused image (displayed at a first camera viewing angle). Then, if so desired, the first paused image may be swapped with a second image (displayed at a second camera viewing angle) without the need to remove the paused mode on the first image. From thereon, the various gestural actions (swiping, pinching etc.) can be carried out upon the second image as well. It may be pertinent to point out that these gestural actions can be carried out without having to change the "paused" mode to a "play" mode in either the first or the second image, as may be necessary in various prior art approaches.

A few examples of various software classes and objects that may be used to implement one or more of the functionalities described above are indicated below.

"UserSessionManager," which is a subclass of "UIViewController" is operative as a top level hierarchy for coordinating tasks such as, for example, managing the initial preparation of a multimedia streaming session, receiving a substantial portion of user interaction events, preparing information needed for changing a camera viewing angle, and configuring animations for transitions among different camera angles.

"ThumbFive" is a subclass of "UIViewController" that is instantiated as a singleton. The purpose of this subclass may be used for visualizing thumbnails previews on screen. A few of such thumbnail operations are described above with reference to the virtual joystick in accordance with the disclosure.

In addition to the example classes provided above, the various embodiments may also incorporate various methods related to video playing and switching management. For example, the method "feedFromInfo:" may be called by a "UserSessionManager" instance both when a video stream is about to start playing on a video player based on an initial video feed, or when a user switching request has been validated for servicing.

The "feedInfo" object, which may be passed by value from the "UserSessionManager" instance, is an object of the class "NSMutableDictionary" whose content is added to the property "currentFeedMonitorDictionary" and contains the initial settings for the switching or for starting play of a first video feed in one or more video players.

The method "evaluateEvent:withValue:" receives externally from "VideoFeed" a certain type of runtime requests, originated from the "UserSessionManager" instance or from other objects. These requests may be either validated before a commitment is perfected or otherwise discarded if the circumstances exclude the commitment.

The "playStatus" value which the "VideoFeed" instance may have when the message "evaluateEvent:withValue:" is received, determines the evaluation result by executing a "switch" statement on the value.

"AudioControl" may be used for reproducing the audio portion of a multimedia content and may also incorporate a reference time code for synchronization of two or more "VideoFeed" objects.

A rotation gesture that may be utilized in one or both of the virtual joystick or the moviola system described above, may be carried out by pressing two fingers on to a touch screen display screen and mimicking a rotation action (clockwise or counterclockwise). This feature may be managed by an API of the class "UIRotationGestureRecognizer."

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments described herein, and are not intended to limit the scope of what the inventors regard as their disclosure. Modifications of the above-described modes for carrying out the disclosure may be used by persons of skill in the relevant arts, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

Addendum

Principal Classes

It may be relevant to point out that many portions of the subject matter provided below may be understood in further detail by referring to various sources such as the AV Foundation Framework material provided by Apple Inc.®.

Class "UserSessionManager"

"UserSessionManager" which is a subclass of "UIViewController," has top level coordinating tasks. It manages the initial preparation of a streaming session, receives a substantial portion of user interaction events, prepares the information needed for changing the camera angle, and configures animations for transitions among view angle.

The declarative interface of "UserSessionManager" is as follows:

UserSessionManager.h

```
//
// UserSessionManagerViewController.h
// iPov3 Cloud
//
// Created by Antonio Rossi on 17/10/11.
// Copyright (c) 2011. All rights reserved.
//
#import <UIKit/UIKit.h>
#import <QuartzCore/QuartzCore.h>
#import <iAd/iAd.h>
#import <CoreMedia/CoreMedia.h>
#import "VideoFeed.h"
@class UserSessionManagerViewController;
@protocol UserSessionManagerViewControllerDelegate <NSObject>
@optional
-
(void)userSessionManagerViewControllerDidCancel:(UserSessionManagerViewController
*)userSessionManager;
@end
@interface UserSessionManagerViewController : UIViewController
<ADBannerViewDelegate, UIWebViewDelegate, VideoFeedDelegate> {
}
```

```
                    UserSessionManager.h
// delegate property
@property (nonatomic, weak) id <UserSessionManagerViewControllerDelegate> delegate;
// show info
@property (nonatomic, strong) NSString *showURLWithString;
@property (nonatomic, strong) NSDictionary *sceneDict;
@end
```

In the header section "UserSessionManager" imports "VideoFeed.h" in order to declare its conformance to the protocol "VideoFeedDelegate," the methods implemented by this protocol will be explained later on.

"UserSessionManager" implements its own "UserSessionManagerDelegate" protocol, which must be adopted by the host class that launches the instance of "UserSessionManager".

The protocol's method "userSessionManagerViewControllerDidCancel:" is used for a show termination.

The single method defined in the protocol is used for terminating a show. A show can be dismissed for example either based on a user request or if a runtime error occurs (a network connection interruption, for example).

The public properties "showURLWithString" and "sceneDict" receive information by the host class launching the instance of "UserSessionManager." This information may be related to the sources composing the show and to preferences settings.

The "sceneDict" object is of a class "NSDictionary", its content may be as follows:

```
[sceneDict description]
{
    PlayMode = 3;
    allowedSwitchingTime = 2;
    audiosOnStage = 1;
    baseURL = "http://test.example.com/aCertainShow/";
    camerasOnStage = 5;
    feedsUrls =        {
        audioFeedFileName =    (
            audio
        );
        audioFeedFileType =    (
            m4v
        );
        thumbFeedFileName =    (
            "sx-thumb",
            "hi-thumb",
            "my-thumb",
            "ph-thumb",
            "dx-thumb"
        );
        thumbFeedFileType =    (
            mov,
            mov,
            mov,
            mov,
            mov
        );
        videoFeedFileName =    (
            sx,
            hi,
            my,
            ph,
            dx
        );
        videoFeedFileType =    (
            m4v,
            m4v,
            m4v,
            m4v,
            m4v
        );
    };
    initialVideoFeed = 4;
    sceneVersion = "1.0";
    showCode = "aShowCode";
    showTitle = "aShowTitle";
}
```

The host class, which instantiates the "UserSessionManager" object, could pass in "showURLWithString" a destination URL in order to load from the network a dictionary containing certain types of information.

Class "ThumbFive"

"ThumbFive" is a subclass of "UIViewController" which is instantiated as a singleton; its purpose is visualizing the thumbnails previews on screen.

The declarative interface of "ThumbFive" is as follows:

```
                    ThumbFive.h
//
// ThumbFive.h
// iPov3 Cloud
//
// Created by Antonio Rossi on 28/11/11.
// Copyright (c) 2011. All rights reserved.
//
#import <UIKit/UIKit.h>
#import <AVFoundation/AVFoundation.h>
#import "Global.h"
@interface ThumbFive : UIViewController {
    int imageViewToUpdateIndex;
    BOOL thumbnailsShown;
}
// camera joystick
@property (strong, nonatomic) IBOutlet UIImageView
*thumbZero;
@property (strong, nonatomic) IBOutlet UIImageView
*thumbOne;
@property (strong, nonatomic) IBOutlet UIImageView
*thumbTwo;
@property (strong, nonatomic) IBOutlet UIImageView
*thumbThree;
@property (strong, nonatomic) IBOutlet UIImageView
*thumbFour;
@property (strong, nonatomic) IBOutlet UIView
*thumbsPanel;
// stripe thumbs
@property (strong, nonatomic) IBOutlet UIView
*stripeThumbnailsContainer;
@property (strong, nonatomic) IBOutlet UIImageView
*stripeThumbOne;
@property (strong, nonatomic) IBOutlet UIImageView
*stripeThumbTwo;
@property (strong, nonatomic) IBOutlet UIImageView
*stripeThumbThree;
@property (strong, nonatomic) IBOutlet UIImageView
*stripeThumbFour;
@property (strong, nonatomic) IBOutlet UIImageView
*stripeThumbFive;
```

-continued

ThumbFive.h

```
@property (nonatomic) int imageViewToUpdateIndex;
@property (nonatomic) BOOL thumbnailsShown;
@property (nonatomic, strong) NSString*
lastImageViewAnimationSubtype;
@property (strong, nonatomic) IBOutlet
UIPanGestureRecognizer *panThumbnails;
// public methods
+(id)sharedThumbFive;
-(void)unloadShow;
-(void)prepareForShow;
-(void)exchangeThumbnailsView;
// user gesture
- (IBAction)dragThumbnails:(id)sender;
@end
```

As described above, a viewer has a choice of visualizing the thumbnail windows in the virtual joystick arranged in a striped configuration or in other configurations.

The instance variable "thumbsPanel" is an object of the class "UIView", and has the function of container view for a group of "UIImageView" objects. The group visualizes the thumbnail previews of the switchable camera angles when the virtual joystick is visible on screen.

This group is composed by the following instance variables:

thumbZero;
thumbOne;
thumbTwo;
thumbThree;
thumbFour;

The other "UIView" instance variable "thumbsPanel" is the container view for the group of "UIImageView" objects that visualize the camera angle previews when a viewer has chosen the striped alignment.

This other group is composed by the following instance variables:

stripeThumbOne;
stripeThumbTwo;
stripeThumbThree;
stripeThumbFour;
stripeThumbFive;

"UserSessionManager" manages the capabilities of presenting thumbnails previews on screen, which "ThumbFive" provides on a user request by calling the public method "exchangeThumbnailsView".

The public method "dragThumbnails:sender" receives messages by a "UIPanGestureRecognizer" object when the user move the virtual joystick on screen by dragging its view container.

Class "VideoFeed"

"VideoFeed" is a subclass of "UIViewController." Its purpose it to present one or both video players on a device screen, continuously monitoring the state of the streaming video by responding to callbacks of a stack of objects that are used to implement the fruition of the video content.

It also responds to switching requests that are propagated by the "UserSessionManager" instance that is managing the show.

The declarative interface of "VideoFeed" is as follows:

VideoFeed.h

```
//
// VideoFeed.h
// iPov3 Cloud
//
// Created by Antonio Rossi on 10/12/11.
// Copyright (c) 2011. All rights reserved.
//
#import <UIKit/UIKit.h>
#import <AVFoundation/AVFoundation.h>
#import <CoreMedia/CoreMedia.h>
#import "EnumKeys.h"
// forward classes declaration
@class StreamConsumerView;
// protocol declaration
@class VideoFeed;
@protocol VideoFeedDelegate <NSObject>
-(void)gestureMapper:(UISwipeGestureRecognizer *)recognizer;
-(void)videoFeedPlayerItemFailed:(NSString*)videoFeedWhoAmI;
-(void)didSwitch:(NSString*)whoAmI;
@end
@interface VideoFeed : UIViewController <UIGestureRecognizerDelegate> {
}
// VideoFeedDelegate protocol delegate
@property (nonatomic, weak) id <VideoFeedDelegate> delegateSessionManager;
// Video Player properties
@property (weak, nonatomic) IBOutlet StreamConsumerView *streamConsumer;
@property (nonatomic, copy) NSString *whoAmI;
@property (nonatomic, strong) NSMutableDictionary
*currentFeedMonitorDictionary;
@property (nonatomic) VideoPlayStatus playStatus;
@property int baseFeed;
// initialization and show management
-(id)initWithVideoFeed:(int)aVideoFeedandPlayerID:(NSString*)aPlayerID;
-(void)prepareForShow:(id)caller;
-(void)play;
-(void)unloadShow;
// playing and switching management
```

-continued

| VideoFeed.h |
|---|
| -(void)feedFromInfo:(NSMutableDictionary*)feedInfo;<br>-(void)evaluateEvent:(ObserverdEvent)event with Value:(id)value;<br>@end |

In the header section, the class "VideoFeed" includes "EnumKeys.h," which is a class whose purpose is to define enumerators. Inside it can be found, values for property "VideoPlayStatus playStatus".

| typedef enum VideoPlayStatus |
|---|
| typedef enum {<br>    PlayStatusUnknown =0,<br>    PlayStatusUnmodified,<br>    PlayerPlayingOnStage,<br>    PlayerAnimatingIn,<br>    PlayerAnimatingOut,<br>    PlayerReadyForStage,<br>    PlayerWaitingKvoEnabler,<br>    PlayerStalled,<br>    PlayerNeedSeekRecursive,<br>    PlayerHadFirstSeek,<br>    PlayerHavingFirstSeek,<br>    PlayerHasDisplayNeedFirstSeek,<br>    PlayerNeedFirstSeek,<br>    PlayerRepositioned,<br>    PlayerRepositioning,<br>    PlayerReplacingPlayerItem,<br>    PlayerBuffering,<br>    PlayerNeedResumingPreviousItem,<br>    PlayerPaused,<br>    PlayerStillResumed,<br>    PlayerStillResuming,<br>    PlayerStillPaused,<br>    PlayerInBackGround,<br>    PlayerCanceledSwitching,<br>    PlayerFeedInitialized,<br>    PlayerFeedNeedInitialize,<br>    LoggingEverything,<br>    PlayerMax<br>} VideoPlayStatus; |

The instance of "UserSessionManager" that is managing the playing of content continuously monitors the property "playStatus" to determine the behavior of the application according to a set of coded rules.

For example, if the user request a switching, it will be accepted exclusively if the "VideoFeed" object that is presenting the video player on screen in that moment has a "playStatus" either equal to "PlayerPlayingOnStage" or "PlayerStillPaused", depending if the video player is currently in play or in pause.

Moreover the acceptance of the switching request is also conditioned by the fact that the second "VideoFeed" object should have a safe status, for example by having its "playStatus" property set to "PlayerPaused".

On the contrary for example, if it the second "VideoFeed" object has a value corresponding to "PlayerReplacingPlayerItem" for its "playStatus", it will mean that a switching was already started before, as a consequence the new user request may be ignored.

The property "playStatus" is also at the core of the innovative method of streaming switching of the present invention, which happens in the steps of going back in time to a previous keyframe and then going to the current time code with a fast forward.

"VideoFeedDelegate" Protocol

The class "VideoFeed" declares a "VideoFeedDelegate" protocol that has to be adopted by "UserSessionManager".

The technique of an Objective-C protocol is well known to the person skilled in the art. A detailed description of such techniques is omitted, because known as such.

A first method "gestureMapper:recognizer" of the "VideoFeedDelegate" protocol has the purpose of propagating the "UISwipeGestureRecognizer" events, received in the "view" of a "VideoFeed" instance which has the video player on screen, up to the "UserSessionManager" instance object for determining how to process these events, for example for commit or discard a switching.

A method "videoFeedPlayerItemFailed:videoFeedWhoAmI" immediately inform the delegate of unrecoverable runtime errors, for example the network connection could became interrupted meanwhile the user is playing content, and in that case the "UserSessionManager" object must promptly manage the event.

Finally the method "didSwitch:whoAmI" of the "VideoFeedDelegate" protocol sends the message that a switching animation transition has been successfully concluded, as a consequence the "UserSessionManager" object can update its status and take note, for example, of which of the two "VideoFeed" instances involved in the switching is the one that is currently showing the video player on screen.

The correct conclusion of a streaming switching is not always guaranteed; a "VideoFeed" object attempting to swap another could fail.

If for example low bandwidth network conditions are impeding the correct functioning, a switching request could be impossible to process, in this case the "UserSessionManager" object will be notified by KVO observing the property "playStatus" of the "VideoFeed" object that would abort the switching, because the "playStatus" will have a value of "PlayerCanceledSwitching" and the method "didSwitch:whoAmI" will not be called in this occurrence.

The property "delegateSessionManager" exposed by "VideoFeed" is declared for the pointer to the "VideoFeedDelegate" object.

Properties for the Video Player

"VideoFeed" expose also a group of core properties for the functioning of the video player.

The property "streamConsumer" is an object of the class "StreamConsumerView" (a subclass of "UIViewController"), the purpose of this class is to provide the "AVPlayerLayer" object that is needed to an "AVPlayer" in order to visualize a content on screen.

The property "whoAmI" is simply indicating, for a given object, which of the two instances of the "VideoFeed" class it is.

The property "currentFeedMonitorDictionary" is a subclass of "NSMutableDictionary", it contains the info correlated to a process of switching, such as the animation settings, the switching start date, the history of the "playStatus" property.

The class "NSMutableDictionary" is well known to the person skilled in the art. A detailed description of such techniques is omitted, because known as such.

The property "baseFeed" is indicating an index in an array of "AVPlayerItem" object, for example when a switching request is initiated its value is set to the desired index for the corresponding video feed to the required camera angle.

The declarative interface of "VideoFeed" then expose public methods for the initialization and show management phases.

The method "initWithVideoFeed:and PlayerID:" has the purpose of initializing the "VideoFeed" object instance at the beginning.

The method "prepareForShow:" has the purpose of initially loading the "AVPlayerItem" objects corresponding to available video feed for the different camera angles, and initially setting up the "AVPlayer" object.

Finally this method registers the "VideoFeed" object as a KVO observer of all the instances of "AVPlayerItem" and "AVPlayer" objects.

The following code listing illustrates the observed properties of AVPlayer:

---
KVO properties of "AVPlayer" observed by "VideoFeed"
---

```
// enable observer for AVPlayer object
    [povPlayer addObserver:self forKeyPath:@"currentItem"
options:NSKeyValueObservingOptionOld|NSKeyValueObservingOptionNew
context:nil];
    [povPlayer addObserver:self forKeyPath:@"status"
options:NSKeyValueObservingOptionOld|NSKeyValueObservingOptionNew
context:nil];
    [povPlayer addObserver:self forKeyPath:@"rate"
options:NSKeyValueObservingOptionOld|NSKeyValueObservingOptionNew
context:nil];
```
---

The following list regards the properties observed by a "VideoFeed" object for all the instances of "AVPlayerItem" loaded into the array, each of the element in the array is corresponding to an available video feed for a camera angle:

---
KVO properties of "AVPlayerItem" observed by "VideoFeed"
---

```
// enable observers for AVPlayerItem object
    [currentItem addObserver:self forKeyPath:@"status"
options:NSKeyValueObservingOptionOld|NSKeyValueObservingOptionNew
context:nil];
    [currentItem addObserver:self forKeyPath:@"playbackLikelyToKeepUp"
options:NSKeyValueObservingOptionOld|NSKeyValueObservingOptionNew
context:nil];
    [currentItem addObserver:self forKeyPath:@"playbackBufferEmpty"
options:NSKeyValueObservingOptionOld|NSKeyValueObservingOptionNew
context:nil];
    [currentItem addObserver:self forKeyPath:@"playbackBufferFull"
options:NSKeyValueObservingOptionOld|NSKeyValueObservingOptionNew
context:nil];
    [currentItem addObserver:self forKeyPath:@"loadedTimeRanges"
options:NSKeyValueObservingOptionOld|NSKeyValueObservingOptionNew
context:nil];
    [currentItem addObserver:self forKeyPath:@"seekableTimeRanges"
options:NSKeyValueObservingOptionOld|NSKeyValueObservingOptionNew
context:nil];
```
---

The methods "play" and "unloadShow" are almost self-explanatory based on their names. The first method is called for start playing the video player, the other one is called when the user ask for a termination of the playing of an event and inform "VideoFeed" that a session must be closed.

Statuses and Events

Concluding the description of the declarative interface of the class "VideoFeed", there are two more methods related to playing and switching management: "feedFromInfo:" and "evaluateEvent:withValue:".

The method "feedFromInfo:" is called by the "UserSessionManager" instance both when a show is start playing with an initial first video feed, or when a user switching request has been validated for processing according to the logic hereto described in the present document.

The "feedInfo" object is passed by value from the "UserSessionManager" instance, it is an object of the class "NSMutableDictionary" whose content is added to the property "currentFeedMonitorDictionary" and contains the initial settings for the switching or for the start playing of a first video feed.

The method "evaluateEvent:withValue:" receives externally from "VideoFeed" a certain type of runtime requests, originated from the "UserSessionManager" instance or from other objects.

These requests need to be either validated before a commitment is perfected or otherwise discarded if the circumstances exclude the commitment.

The "playStatus" value that the "VideoFeed" instance has when the message "evaluateEvent:withValue:" is received, determines the evaluation result by executing a "switch" statement on said value.

The enumerated values of these requests are codified inside an "ObservedEvent" enum variable passed by value; the type definition is as follows:

---
Type definition for enum "ObservedEvent"
typedef enum {
---

-continued

```
        PlayStatus = 0,
        PlayerLoaded,
        PlayerStillLoading,
        PlayStatusSame,
        PlayStatusChanged,
        PlayBackLikelyToKeepUp,
        PlayBackBufferEmpty,
        PlaybackBufferFull,
        PlayerItemStatusUnknown,
        PlayerItemStatusReadyToPlay,
        PlayerItemStatusFailed,
        AVPlayerCurrentItem,
        UnknownAVPlayerStatus,
        ReadyToPlayAVPlayerStatus,
        FailedAVPlayerStatus,
        Rate,
        LoadedTimeRanges,
        SetStreamRenderedToPovPlayer,
        SetStreamRenderedToNil,
        VideoSyncManager,
        SeekToAudio,
        SeekToPlayerHadFirstSeek,
        SeekRecursiveToAudio,
        FinishedSeekToAudio,
        FinishedSeekRecursiveToAudio,
        UnfinishedSeekToAudio,
        UnfinishedModifiedlayStatusSeekToAudio,
        PlayCommand,
        PlayCommandPause,
        Animationstopped,
        FeedFromInfo,
        SwitchingTimer,
        BufferingCheck,
        BufferingNotProgressing,
        TimeRanges,
        LikelyToKeepBuffer,
        FastSwitching,
        PlayerLayerReadyForDisplay,
        PlayerLayerNotReadyForDisplay,
        IteratedItem,
        SessionManager,
        SessionManagerAskInitialize,
        SessionManagerReadyForShow,
        SessionManagerAnimationIniting,
        SessionManagerAnimationCompleted,
        SessionManagerPlay,
        SessionManagerPause,
        SessionManagerAskBackground,
        SessionManagerAskOnStage,
        SessionManagerCanceled,
        SeekToAudioOverTime,
        StalledFromAudio,
        StillPausedFromAudio,
        CommandsPanelPlayPressed,
        CommandsPanelPausePressed,
        CommandsPanelPlayAcknowledged,
        CommandsPanelPauseAcknowledged,
        CommandsPanelSliderMoved,
        CommandsPanelSliderMovedAckonwledged,
        ObserverdKeyMax
} ObserverdEvent;
```

For example a message with a value "CommandsPanelPlayPressed" is indicating that the viewer pressed a play button in the user interface, and it will be discarded if in that moment the "playStatus" will result to have a value of either "PlayerStalled" or "PlayerBuffering".

The method "evaluateEvent:withValue:" calls are also being generated internally by "VideoFeed" by the callbacks of the observed properties of "AVPlayer" and "AVPlayerItem".

Also for these calls it is the value of "playStatus" to determine the final result.

For example an "ObservedEvent" with passed value "PlayBackBufferEmpty", meanwhile the "playStatus" is "PlayerPlayingOnStage", will produce the effect of pausing the "AVPlayer" in order to recreate its buffer, and the resulting "playStatus" will be modified to "PlayerBuffering".

If in a different circumstance the "playStatus" value is for example "PlayerWaitingKvoEnabler", indicating an advanced step of a switching to a new destination video feed, the same "ObservedEvent" "PlayBackBufferEmpty" will produce an effect of a switching cancellation, and the resulting "playStatus" value will be modified to "PlayerCanceledSwitching".

Class "AudioControl"

The class "AudioControl" is a subclass of "NSObject." "AudioControl" may be used for reproducing the audio portion of a show. Moreover an audio track of this audio portion may be used as the reference time code for the synchronization of both the "VideoFeed" objects, finally also the images previews presented inside the thumbnails synchronize with the same reference time code provided by this class.

This class "AudioControl" initializes as a singleton.

The declarative interface of "AudioControl" is as follows:

```
AudioControl.h

//
// AudioControl.h
// iPov3 Cloud
//
// Created by Antonio Rossi on 17/11/11.
// Copyright (c) 2011. All rights reserved.
//
#import <UIKit/UIKit.h>
#import <AVFoundation/AVFoundation.h>
#import <CoreMedia/CoreMedia.h>
#import "EnumKeys.h"
@interface AudioControl : NSObject {
    AudioPlayStatus audioStatus;
    Float64 rate;
}
// audio objects
@property (nonatomic, strong) AVPlayerItem *audioItem;
@property (nonatomic, strong) AVPlayer *audioPlayer;
// public properties (also kvo observed)
// status of audio track
@property (nonatomic) AudioPlayStatus audioStatus;
// time code related properties
@property (nonatomic) Float64 rate;
@property (nonatomic) double moviola;
@property (nonatomic) CMTime moviolaAudioCMTime;
// initing and closing instance
+(id)audioControl;
-(void)prepareForShow;
- (void)unloadShow;
// runtime management public methods
-(void)play;
-(void)pause;
// time code related methods
-(CMTime)currentTime;
-(CMTime)totalTime;
@end
```

The property "audioStatus" is analogous to the property "playStatus" of "VideoFeed" and can be understood accordingly.

Class "SceneDescriptor"

The class "SceneDescriptor" is a subclass of "NSObject". Its purpose it to support the loading of multimedia assets for the other objects of the application.

Class "CommandsPanel"

The class "CommandsPanel" is a subclass of "UIViewController". Its purpose it to manage a panel with the commands that a user can give, such as "play" or "pause", or to call other menus the application may have.

Class "GestureManager"

The class "GestureManager" is a subclass of "NSObject".

The public property "aDestinationFeed" has the purpose of indicating an index in the array of "AVPlayerItem" managed by "VideoFeed".

The index is corresponding to a camera angle for a point of view related either to its position inside the buttons of the virtual joystick or the destination video feed for a swipe gesture.

The declarative interface of "GestureManager" is as follows:

```
GestureManager.h

//
// GestureManager.h
// iPov3 Cloud
//
// Created by Antonio Rossi on 17/10/11.
// Copyright (c) 2011. All rights reserved.
//
#import <Foundation/Foundation.h>
#import <UIKit/UIKit.h>
typedef enum {
    UserWantsCameraSwitchRight = 1 << 0,
    UserWantsCameraSwitchLeft = 1 << 1,
    UserWantsCameraSwitchUp = 1 << 2,
    UserWantsCameraSwitchDown = 1 << 3,
} FeedRequiredBySwipe;
@interface GestureManager : NSObject {
}
//property indicating an index in an array, the index is corresponding
to a camera angle for a point of view related either to its position
inside the buttons of the virtual joystick or the destination video
feed for a swipe gesture
@property int aDestinationFeed;
//this method return a Bool value indicating if a switching in a given
direction is possible, either for a swipe gesture or for a button touched
inside the virtual joystick
-(BOOL)canSwitchToFeed:(FeedRequiredBySwipe)aRequiredFeed
fromVideoFeed:(int)aVideoFeed;
@end
```

The values that "aDestinationFeed" assumes are determined when the public method "canSwitchToFeed:fromVideoFeed:" is called.

The public method canSwitchToFeed:fromVideoFeed:" furthermore return a Boolean value, indicating if a switching in a given direction is possible, either for a swipe gesture or for a button touched inside the virtual joystick.

The enumerator type "FeedRequiredBySwipe" is related to the direction given by the user via a swipe gesture for commuting to the required camera angle.

Virtual Joystick Implementation

As described above, an instance of the class "ThumbFive" manages the functions of the virtual joystick and its presentation on screen.

In its private method "prepareForShow" "ThumbFive", after initially instantiated, setup some arrays, which contain pointer to the "UIImageView" properties that will contain the previews of the various camera angles.

At the beginning of a show, the method "prepareForShow" is called by the "UserSessionManager" instance, the code listing of this method is the following:

```
Class "ThumbFive" / method "prepareForShow"
-(void)prepareForShow {
    // initial setup of array containing thumbnails previews updated
    images
    iPovLogo =
    [UIImage imageWithContentsOfFile:[[NSBundle mainBundle]
pathForResource:@"iPOV-43" ofType:@"png"]];
    updatedImage = [[NSMutableArray alloc] initWithCapacity:1];
    for (id element in [[sceneDescriptor showAssets]
objectForKey:@"thumbFeedAsset"]) {
        [updatedImage addObject:iPovLogo];
    }
    // prepare content generator to use inside thumbnails
    imageGenerator = [[sceneDescriptor showPlayerItems]
objectForKey:@"thumbAVAssetImageGenerator"];
    // init the array for thumbnails previews – virtual joystick
    thumbmailImageViews = [[NSArray alloc]
initWithObjects:thumbZero, thumbOne, thumbTwo, thumbThree,
thumbFour, nil];
    // init the array for thumbnails preview – striped
    stripeThumbnailImageViews = [[NSArray alloc]
initWithObjects:stripeThumbOne, stripeThumbTwo,
stripeThumbThree,stripeThumbFour,stripeThumbFive, nil];
    // init the array containing the indices indicating which of the
    available video feed has to be put inside each buttons of the
    virtual joystick
    povInsideThumbnails = [[NSMutableArray alloc]
initWithObjects:[NSNumber numberWithInt:0], [NSNumber
numberWithInt:0], [NSNumber numberWithInt:0], [NSNumber
numberWithInt:0], [NSNumber numberWithInt:0], nil];
    //init the array used to check if "previousPovInsideThumbnails"
was mutated, so as to animate a switching of point of view inside
the virtual joystick images previews
    previousPovInsideThumbnails = [[NSMutableArray alloc]
initWithObjects:[NSNumber numberWithInt:0], [NSNumber
numberWithInt:0], [NSNumber numberWithInt:0], [NSNumber
numberWithInt:0], [NSNumber numberWithInt:0], nil];
    // set the updating indexes
    thumbnailNeedUpdating = 0;
    currentUpdatedThumb = CAMERAS_ON_STAGE – 1;
    // init the updating timer
    updateTimer = [NSTimer scheduledTimerWithTimeInterval:0.1
target:self selector:@selector(updateAnimation:)
userInfo:nil repeats:YES];
    // intializes the other objects
    gestureManager = [[GestureManager alloc] init];
}
```

The array "updatedImage" is initially filled with logo images to use as placeholders of the previews images, either when the virtual joystick is initially shown on screen or when a preview image for a video feed of a camera angle is unavailable.

The number of element filling "updatedImages" is corresponding to the number of point of views of the different camera angles available, and is determined by how many objects that are loaded by "SceneDescriptor" in the array "thumbFeedAsset".

The loading of "thumbFeedAsset" is determined by the content of the dictionary "sceneDict" (described before) for a given show.

The array "imageGenerator" is then loaded, using the array corresponding to the key @"thumbAVAssetImageGenerator" in the dictionary "showPlayerItems" of the auxiliary class "SceneDescriptor".

This array contains objects of the class "AVAssetImageGenerator", which is a class of the API of iOS whose purpose is to generate images from video sources.

Each of the available video feed corresponding to each available camera angle will load its own dedicated "AVAssetImageGenerator" inside "imageGenerator".

The array "thumbmailImageViews" is loaded with pointers to the "UIImageView" properties (described above) that are used to visualize images inside the windows of the virtual joystick.

The array "stripeThumbnailImageViews" load instead the pointers for the "UIImageView" properties that are associated with the "UIImageView" objects used when the striped previews are requested in alternative to the joystick.

The array "povInsideThumbnails" is initially loaded with placeholder values. This array contains the indices indicating which of the available video feeds has to be put inside each window of the virtual joystick.

The array "previousPovInsideThumbnails" is initially loaded with placeholder values. Its purpose is to check if an object inside "previousPovInsideThumbnails" was mutated, so as to give information needed to animate a switching of point of view inside the virtual joystick images previews.

The method then loads the initial values for the variables "thumbnailNeedUpdating" and "currentUpdatedThumb" that are used as indexes by the algorithm of the method periodically called by the timer "updateTimer", that will be shown later on.

Finally the method instantiate an object of the class "GestureManager" (described before) that will be used to validate the "imageGenerator" objects inside the buttons of the joystick.

Periodically Updating the Joystick

The purpose of the method "updateAnimation:" is to call another method "updateThumbnailImagesElement:" only when this last one has finished completely a previous run.

This previous run completion is known by when the two variable "currentUpdatedThumb" and ""thumbnailNeedUpdating" are having the same values.

The variable "thumbnailNeedUpdating" is incremented only when "updateThumbnailImagesElement:" has finished, so to permit to the timer routing to call a new iteration.

When a new update is enabled, "currentUpdatedThumb" and "thumbnailNeedUpdating" receive the same value, so to avoid the run in parallel of another update.

---

Class "ThumbFive" / method "updateAnimation:"

```
-(void)updateAnimation:(NSTimer*)theTimer {
    if (currentUpdatedThumb != thumbnailNeedUpdating) {
        currentUpdatedThumb = thumbnailNeedUpdating;
        [self updateThumbnailImagesElement:thumbnailNeedUpdating];
    }
// omissis
}
```

---

Getting Updated Images for the Thumbnails Previews

The method "updateThumbnailImagesElement:" load images inside the thumbnails from the corresponding video feeds using the current time code of the audio of the show reproduced on screen.

This value is obtained by messaging the method "currentTime" of the object of the class "AudioControl" described before.

Then the method sends the message "generateCGImagesAsynchronouslyForTimes:completionHandler:" to the "AVAssetImageGenerator" object of the preview that need updating.

Finally it enables the next updating by incrementing "thumbnailNeedUpdating".

---

Class "ThumbFive" / method "updateThumbnailImagesElement:"

```
-(void)updateThumbnailImagesElement:(int)index {
    CMTime showTime = [audioControl currentTime];
    NSArray *frameAtShowTime = [NSArray
arrayWithObject:[NSValue valueWithCMTime:showTime]];
    ___block UIImage *thumbImage = nil;
    AVAssetImageGeneratorCompletionHandler handler =
 ^(CMTime requestedTime, CGImageRef image, CMTime actualTime,
```

---

-continued

Class "ThumbFive" / method "updateThumbnailImagesElement:"

```
AVAssetImageGeneratorResult result, NSError *error)
    {
        switch (result) {
            case AVAssetImageGeneratorSucceeded:
            {
                // thumbFive could generate an image for thumbnail
                   at index
                thumbImage = [UIImage imageWithCGImage:image];
            }
            break;
            case AVAssetImageGeneratorFailed:
                //
                NSLog (@"thumbFive could not generate an image
for thumbnail at index:%d:, error:%@", index, error);
                break;
            case AVAssetImageGeneratorCancelled:
                //
                NSLog (@"thumbFive image generator canceled
for thumbnail at index:%d, reason:%@", index, error);
                break;
            default:
                break;
        }
        if (thumbImage != NULL) {
            [updatedImage replaceObjectAtIndex:index
                withObject:thumbImage];
        }
        int temp = thumbnailNeedUpdating + 1;
        [self setThumbnailNeedUpdating:temp];
    };
    [[imageGenerator objectAtIndex:index]
generateCGImagesAsynchronouslyForTimes:frameAtShowTime
completionHandler:handler];
}
```

---

In the step of incrementing "thumbnailNeedUpdating" the method "setThumbnailNeedUpdating:counterValue" is called.

Inside this method the value of the "thumbnailNeedUpdating" variable is incremented or zeroed, depending if it is above the number of video feeds on stage, so to continuously recycle all of these.

Then the method "updateThumbnailView" is called on the main thread.

---

Class "ThumbFive" / method "setThumbnailNeedUpdating:"

```
-(void)setThumbnailNeedUpdating:(int)counterValue {
    if (counterValue >= CAMERAS_ON_STAGE) {
        thumbnailNeedUpdating = 0;
        [self performSelector:@selector(updateThumbnailView)
onThread:[NSThread mainThread] withObject:nil waitUntilDone:NO];
    } else {
        thumbnailNeedUpdating = counterValue;
    }
}
```

---

The reason for a call on the main thread is that otherwise the updated "UIImageView" will not be actually shown on the user interface, because this depends on the functioning of "iOS".

Updating Images of the Video Feeds Inside the Thumbnails Previews

The method "updateThumbnailView" prepares for a final transition on screen of updated thumbnails.

It determines by calling the instantiated object "gestureManager" (described above) the indexes of the updated video feeds images and putting these values inside the array "povInsideThumbnails" in the method "updateThumbnailView."

These indexes are corresponding to the video feeds for the camera angles available, and are used to put images inside the virtual joystick according to a relation in space with the current video feed currently reproduced on screen.

After a switching there is a new video source reproduced by the video player, this video source will have different relationship with the camera angles that are inside the image previews of the button of the joystick.

This new relationship will be reflected in the value returned by the property "aDestinationFeed" of the object "gestureManager".

The following is a code listing of the method "canSwitchToFeed:fromVideoFeed" of the class "GestureManager":

---

Class "GestureManager" - method "canSwitchToFeed:fromVideoFeed"

```
-(BOOL)canSwitchToFeed:(FeedRequiredBySwipe)aRequiredFeed
fromVideoFeed:(int)aVideoFeed {
    BOOL switchableResult = NO;
    switch (aVideoFeed) {
        case 0: // dx point of view
            // we are at dx point of view in the element 0 of video
            feed array");
            switch (aRequiredFeed) {
                case UserWantsCameraSwitchUp:
                    switchableResult = YES;
                    aDestinationFeed = 3;
                    break;
                case UserWantsCameraSwitchRight:
                    switchableResult = YES;
                    aDestinationFeed = 4;
                    break;
                case UserWantsCameraSwitchLeft:
                    switchableResult = YES;
                    aDestinationFeed = 2;
                    break;
                case UserWantsCameraSwitchDown:
                    switchableResult = YES;
                    aDestinationFeed = 1;
                    break;
                default:
                    break;
            }
            break;
        case 1: // hi point of view
            switch (aRequiredFeed) {
                case UserWantsCameraSwitchUp:
                    switchableResult = YES;
                    aDestinationFeed = 2;
                    break;
                case UserWantsCameraSwitchRight:
                    switchableResult = YES;
                    aDestinationFeed = 0;
                    break;
                case UserWantsCameraSwitchDown:
                    switchableResult = YES;
                    aDestinationFeed = 3;
                    break;
                case UserWantsCameraSwitchLeft:
                    switchableResult = YES;
                    aDestinationFeed = 4;
                    break;
                default:
                    break;
            }
            break;
        case 2: // center point of view
            switch (aRequiredFeed) {
                case UserWantsCameraSwitchUp:
                    switchableResult = YES;
                    aDestinationFeed = 3;
                    break;
                case UserWantsCameraSwitchRight:
                    switchableResult = YES;
                    aDestinationFeed = 0;
                    break;
                case UserWantsCameraSwitchDown:
                    switchableResult = YES;
                    aDestinationFeed = 1;
```

Class "GestureManager" - method "canSwitchToFeed:fromVideoFeed"

```
                    break;
                case UserWantsCameraSwitchLeft:
                    switchableResult = YES;
                    aDestinationFeed = 4;
                    break;
                default:
                    break;
            }
            break;
        case 3: // top point of view
            switch (aRequiredFeed) {
                case UserWantsCameraSwitchUp:
                    switchableResult = YES;
                    aDestinationFeed = 1;
                    break;
                case UserWantsCameraSwitchRight:
                    switchableResult = YES;
                    aDestinationFeed = 0;
                    break;
                case UserWantsCameraSwitchDown:
                    switchableResult = YES;
                    aDestinationFeed = 2;
                    break;
                case UserWantsCameraSwitchLeft:
                    switchableResult = YES;
                    aDestinationFeed = 4;
                    break;
                default:
                    break;
            }
            break;
        case 4: // sx point of view
            switch (aRequiredFeed) {
                case UserWantsCameraSwitchUp:
                    switchableResult = YES;
                    aDestinationFeed = 3;
                    break;
                case UserWantsCameraSwitchRight:
                    switchableResult = YES;
                    aDestinationFeed = 2;
                    break;
                case UserWantsCameraSwitchDown:
                    switchableResult = YES;
                    aDestinationFeed = 1;
                    break;
                case UserWantsCameraSwitchLeft:
                    switchableResult = YES;
                    aDestinationFeed = 0;
                    break;
                default:
                    break;
            }
            break;
        default:
            if (switchableResult == YES) {
                NSLog(@"is ok to switch");
            }
            break;
    }
    return switchableResult;
}
```

As we can see the destination video feed is hardcoded inside the method, for every direction of the gesture that any of the camera angles could receive.

It is corresponding to a default format in the disposition of the camera angle in the preferred embodiment of the present invention.

The one skilled in the art could devise another embodiment of the present invention, by encoding of the positions of the other camera angles, of any available camera angle, in the "sceneDict" dictionary described before.

Further another embodiment of the present invention could be devised by the one skilled in the art, by updating the positions of the other camera angles, of any available camera angle, in the case they are moving and are exchanging their relative positioning, by gathering the camera position 3D coordinates, for each of the available video feeds, and updating the method calculation.

---

Class "ThumbFive" / method "updateThumbnailView "

```
-(void)updateThumbnailView {
    int zeroIndex = CAMERAS_ON_STAGE;
    int oneIndex = CAMERAS_ON_STAGE;
    int twoIndex = CAMERAS_ON_STAGE;
    int threeIndex = CAMERAS_ON_STAGE;
    int fourIndex = CAMERAS_ON_STAGE;
    // determine disposition of images previews inside the joystick button
    if ([gestureManager
canSwitchToFeed:(FeedRequiredBySwipe)UISwipeGestureRecognizerDirectionRight
fromVideoFeed:imageViewToUpdateIndex]) {
        zeroIndex = gestureManager.aDestinationFeed;
    }
    if ([gestureManager
canSwitchToFeed:(FeedRequiredBySwipe)UISwipeGestureRecognizerDirectionDown
fromVideoFeed:imageViewToUpdateIndex]) {
        oneIndex = gestureManager.aDestinationFeed;
    }
    if ([gestureManager
canSwitchToFeed:(FeedRequiredBySwipe)UISwipeGestureRecognizerDirectionUp
fromVideoFeed:imageViewToUpdateIndex]) {
        threeIndex = gestureManager.aDestinationFeed;
    }
    if ([gestureManager
canSwitchToFeed:(FeedRequiredBySwipe)UISwipeGestureRecognizerDirectionLeft
fromVideoFeed:imageViewToUpdateIndex]) {
        fourIndex = gestureManager.aDestinationFeed;
    }
    [povInsideThumbnails replaceObjectAtIndex:0 withObject:[NSNumber numberWithInt:zeroIndex]];
    [povInsideThumbnails replaceObjectAtIndex:1 withObject:[NSNumber numberWithInt:oneIndex]];
    [povInsideThumbnails replaceObjectAtIndex:2 withObject:[NSNumber numberWithInt:twoIndex]];
    [povInsideThumbnails replaceObjectAtIndex:3 withObject:[NSNumber numberWithInt:threeIndex]];
    [povInsideThumbnails replaceObjectAtIndex:4 withObject:[NSNumber numberWithInt:fourIndex]];
    // replace thumbnails in view
    if (zeroIndex < CAMERAS_ON_STAGE) {
        [self animatePovInsideThumbnailsAtIndex:0];
    }
    if (oneIndex < CAMERAS_ON_STAGE) {
        [self animatePovInsideThumbnailsAtIndex:1];
    }
    if (threeIndex < CAMERAS_ON_STAGE) {
        [self animatePovInsideThumbnailsAtIndex:3];
    }
    if (fourIndex < CAMERAS_ON_STAGE) {
        [self animatePovInsideThumbnailsAtIndex:4];
    }
    // do update stripeThumbnail view
    //
    // omissis
}
```

Finally for each thumbnails corresponding to each button of the virtual joystick, the final updating method "animatePovInsideThumbnailsAtIndex:" is called.

---

Class "ThumbFive" / method "animatePovInsideThumbnailsAtIndex:"

```
-(void)animatePovInsideThumbnailsAtIndex:(int)index {
    BOOL viewInsideChanged = ([[povInsideThumbnails
objectAtIndex:index] intValue] != [[previousPovInsideThumbnails
objectAtIndex:index] intValue]);
```

The updating of this value will produce also an animation that will be applied to the virtual joystick; this process is detailed later on.

The values obtained are used by the method "updateThumbnailsView", whose code listing follows here:

---

-continued

Class "ThumbFive" / method "animatePovInsideThumbnailsAtIndex:"

```
    switch (viewInsideChanged) {
        case YES:
        {
            //
            int thisFeedIndex = [[povInsideThumbnails
            objectAtIndex:index] intValue];
            // setting animation parameters
            CATransition *transition = [CATransition animation];
```

-continued

Class "ThumbFive" / method "animatePovInsideThumbnailsAtIndex:"

```
        transition.duration = 0.5f;
        transition.timingFunction = [CAMediaTimingFunction
functionWithName:kCAMediaTimingFunctionEaseInEaseOut];
        transition.type = kCATransitionPush;
        transition.subtype = lastImageViewAnimationSubtype;
        transition.removedOnCompletion = YES;
        transition.delegate = self;
        [[[thumbmailImageViews objectAtIndex:index] layer]
addAnimation:transition forKey:@"thumbnailAnimation"];
        [[thumbmailImageViews objectAtIndex:index]
setImage:[updatedImage objectAtIndex:thisFeedIndex]];
        [previousPovInsideThumbnails replaceObjectAtIndex:index
withObject:[NSNumber numberWithInt:thisFeedIndex]];
        }
        break;
    case NO:
        //
        {
        int thisFeedIndex = [[povInsideThumbnails
        objectAtIndex:index] intValue];
        [[thumbmailImageViews objectAtIndex:index]
setImage:[updatedImage objectAtIndex:thisFeedIndex]];
        }
        break;
    default:
        break;
    }
}
```

In this method it is evaluated if the preview image for the current index has been effectively updated by comparing the current value of the object at that index in the "povInsideThumbnails" array in respect to the "previousPovInsideThumbnails" array.

If they differ among each other, it would indicate that a switching among different video feeds of different camera angle was happened just before, and the "YES" case of the "switch" statement" will be evaluated.

As a consequence from the array "povInsideThumbnails" is extracted a value that is used as the index to access the array "updatedImage".

In this manner the image preview that is suitable is for the joystick button, which need updating, is animated with an instance of "CATransition", and finally replaces a previous image.

The variable "lastImageViewAnimationSubtype" contains the same value of the transition subtype used for animating a switching for the video player, so as to setup the same animation for the joystick buttons.

The variable "lastImageViewAnimationSubtype" contains the same value of the transition subtype used for animating a switching for the video player, so as to have the same animation for the joystick buttons.

If for example the user gave a swipe gesture in the left direction, the switching for the video player will produce a push transition animation with the destination video feed sliding in from the right to left, and exactly the same animation effects will be given to each updating images inside the buttons of the virtual joystick.

The method concludes taking note of its activity by refreshing the array "previousPovInsideThumbnails", it will not enter again inside this branch until a new switching command.

If both "povInsideThumbnails" and "previousPovInsideThumbnails" arrays have a same value at the index, the "NO" case of the "switch" statement is instead evaluated.

In this branch of execution, the images inside the buttons are only updating to the current time code using no animation, no position inside the joystick need to be modified.

The Switching Engine Implementation

The method "seekToAudioTime:fromPlayerStatus:toPlayerStatusOnExit:usingRecursion:" for seeking in a destination video feed the reference time code of an origin video feed, is declared inside the class "VideoFeed", given the length of its name we will refer to it with the shorter name "seekToAudio" in the present description.

To seek inside a destination video source the reference time code of a origin video feed actually means to seek the destination video feed to the time code of the audio track, that the originating video feed is obliged to keep constantly synchronized. It is evident to one skilled in the art, that other sources of time code may be used as well, for example, an external SMTPE time code generator, that may be present in one or more audio or video streams.

The method "seekToAudio" encapsulates and extend the capabilities of an API call of "iOS", whose name "seekToTime:toleranceBefore:toleranceAfter:completionHandler:", it is part of the "AVFoundation.framework" and can be called for objects of classes "AVPlayer" and "AVPlayerItem".

The method "seekToAudio" has two "VideoPlayStatus" arguments passed by value, the first one is the "playStatus" value which an object of the class "VideoFeed" has when entering, the other one is a required "playStatus" that is should reach at the end execution.

In an embodiment of the present disclosure the escalation of the property "playStatus" of the class "VideoFeed" determines the steps of the switching.

To present a destination video feed for a different video source, means to start an escalation of its "playStatus" property, that begins with the level "PlayerNeedReplacingPlayerItem", continues to a first new resulting level "PlayerHavingFirstSeek", then pass for "PlayerHadFirstSeek" and continue up to either "PlayerPlayingOnStage" or "PlayerCanceledSwitching".

The object of the class "VideoFeed" is KVO observing the properties of all its objects related to the reproducing of video content ("AVPlayer", "AVPlayerItem", "AVPlayerLayer"), the results of this observations send messages of type "evaluateEvent:withValue:" to the object itself, these messages are contributing to the process of escalation.

For example, when a video feed is almost ready for be reproduced by the video player, its "playStatus" is "PlayerWaitingKvoEnabler" and inside "evaluateEvent:withValue:" the following code flow is executed:

Evaluating "playStatus PlayerWaitingKvoEnabler" inside"evaluateEvent:withValue:"

```
case PlayerWaitingKvoEnabler:
{
    switch (reasonForFeedRequest) {
        case NeedPlayerSwitch:
            //
            switch (event) {
                case LoadedTimeRanges:
```

Evaluating "playStatus PlayerWaitingKvoEnabler"
inside"evaluateEvent:withValue:"

```
            {
                triggedPlayStatus = PlayerReadyForStage;
            }
            break;
        case PlayBackLikelyToKeepUp:
            {
                switch (valueBool) {
                    case YES:
                        if ([self cleanPovPlayer]) {
                            triggedPlayStatus = PlayerReadyForStage;
                        }
                        break;
                    case NO:
                        triggedPlayStatus = PlayerCanceledSwitching;
                        break;
                    default:
                        break;
                }
            }
            break;
        case Rate:
            switch (thisRateState) {
                case PlayingRateStalled:
                    triggedPlayStatus = PlayerNeedResumingPreviousItem;
                    break;
                case PlayingNormalRate:
                {
                    if ([self cleanPovPlayer]) {
                        triggedPlayStatus = PlayerReadyForStage;
                    }
                }
                    break;
                case VideoSyncManager:
                {
                    if ([self cleanPovPlayer]) {
                        triggedPlayStatus = PlayerReadyForStage;
                    }
                }
                    break;
                default:
                    break;
            }
            break;
        default:
            break;
    }
    break;
}
    break;
```

One can understand from the code listing, that an event of type "PlayBackLikelyToKeepUp" with a value of "NO" will produce a switching cancellation instead of a switching completion (obviously there is no point to presenting on screen a video source that is not able to play).

The event of type "PlayBackLikelyToKeepUp" of the example are sent by the KVO observation of the property "playbackLikelyToKeepUp" of the "AVPlayerItem" object (registering "AVPlayerItem" property for KVO observation was shown before).

At the same time the method "seekToAudio" is a fundamental contributor, when it is called, for the process of the "playStatus" escalation", because at the end of its execution the value of "playStatus" will be modified to the value requested.

The last argument "recursive" determines if the method "seekToAudio" executes the recursive branch of its algorithm, or on the contrary if a single run is needed.

If a recursive execution is requested, "seekToAudio" will repeat another recursive call to itself. This is a final stage of seeking to the reference time code, when the exact correspondence to the reference time code is requested.

If a recursive execution is not requested, "seekToAudio" will run only once and then will conclude to the new required "playStatus" value.

In this modality the play head seeks the first available keyframe backward in time (in respect to the reference time code) if a local variable "beforeTolerance" (of the method "seekToAudio") is set to a value of "kCMTimePositiveInfinity".

"kCMTimePositiveInfinity" is a value that a "CMTime" structure can assume, for documentation and reference information about "CMTime" see: https://developer.apple.com/library/iosNdocumentation/CoreMedia/Reference/CM-Time/Re ference/reference.html The value of "beforeTolerance" is used as the value passed to the argument "toleranceBefore" of the message "seekTo- Time:toleranceBefore:toleranceAfter:completionHandler:" sent to "povPlayer", and when it is equal to "kCMTimePositiveInfinity", at the same time that the value of the argument "toleranceAfter" is set to "kCMTimeZero", the playhead seeks backward to the first available keyframe.

The code listing for "seekToAudio" is now presented before the final explanation is given.

To ease the comprehension of the code, the following listing is commented inside the instructions flow:

Class "ThumbFive" / method "animatePovInsideThumbnailsAtIndex:"

```
-(void)seekToAudioTime:(CMTime)audioTime
fromPlayerStatus:(VideoPlayStatus)playerStatusWhenCalling
toPlayerStatusOnExit:(VideoPlayStatus)requiredPlayerStatusOnExit
usingRecursion:(BOOL)recursive {
    // cancel a switching if it is taking more time than authorized
    if ((playStatus == PlayerHavingFirstSeek) || (playStatus ==
PlayerNeedSeekRecursive) || (playStatus == PlayerWaitingKvoEnabler)) {
        NSTimeInterval switchingTimeUntilNow = [[NSDate date]
timeIntervalSinceDate:switchRequestDate];
        if (switchingTimeUntilNow > timeAllowedForSwitching) {
            [[povPlayer currentItem] cancelPendingSeeks];
            [self evaluateEvent:SeekToAudioOverTime withValue:nil];
        }
    }
    // determine the tolerance that seekToTime will have backwards in time
    CMTime beforeTolerance;
    switch (recursive) {
            // if called recursively always seek exactly to the required time code
        case YES:
        {
            // move the playhead fast forward up to the exact required time code
            beforeTolerance = kCMTimeZero;
        }
            break;
            // there may be a case for seeking to a keyframe backward in time
        case NO:
        {
            switch (requiredPlayerStatusOnExit) {
                case PlayerBuffering:
                case PlayerStillResumed:
                    //
                    // we need the exact frame, how much time it takes is not a problem
                    //
                    beforeTolerance = kCMTimeZero;
                    break;
                case PlayerHadFirstSeek:
                    //
                    // seeking to a keyframe backward in time
                    // in respect to the reference time code
                    //
                    beforeTolerance = kCMTimePositiveInfinity;
                    break;
                default:
                    break;
            }
        }
            break;
        default:
            break;
    }
    // seek to required time code
    [povPlayer seekToTime:audioTime toleranceBefore:beforeTolerance
toleranceAfter:kCMTimeZero completionHandler:^(BOOL finished) {
        // execute following code only if in the meantime playStatus did not change
        if (playerStatusWhenCalling == playStatus) {
            // seekToTime execution completed successfully
            if (finished) {
                if (recursive) { // this is the branch called when recursive option = YES
                    // get time code difference with reference audio track
                    CMTime afterSeekAudioTime = [audioControl currentTime];
                    Float64 afterSeekAudioTimeInSeconds =
CMTimeGetSeconds(afterSeekAudioTime);
                    CMTime afterSeekVideoTime = [povPlayer currentTime];
                    Float64 afterSeekVideoTimeInSeconds =
CMTimeGetSeconds(afterSeekVideoTime);
                    Float64 audioVsVideoTimeDifference = afterSeekAudioTimeInSeconds
- afterSeekVideoTimeInSeconds;
                    if (audioVsVideoTimeDifference < 0) {
                        audioVsVideoTimeDifference = -audioVsVideoTimeDifference;
                    }
                    // check if we have synchronized the reference time code
                    if (audioVsVideoTimeDifference > SWITCH_ALLINEATION_TIME) {
```

| Class "ThumbFive" / method "animatePovInsideThumbnailsAtIndex:" |
| --- |

```
// we have not yet synchro, called in recursive mode, launch process again
                        // collecting statistical data
                        [sharedFeedMonitor addEvent:SeekRecursiveToAudio
playStatus:playStatus value:[NSNumber numberWithBool:NO] trigger: YES
toPlayStatus:requiredPlayerStatusOnExit dictionary:currentFeedMonitorDictionary];
                        // launching a recursion to myself
                        [self seekToAudioTime:[audioControl currentTime]
fromPlayerStatus:playerStatusWhenCalling
toPlayerStatusOnExit:requiredPlayerStatusOnExit usingRecursion:YES];
                } else { // we have synchro, not anymore launching a recursive seek
                        // set the new playstatus
                        [sharedFeedMonitor addEvent:FinishedSeekRecursiveToAudio
playStatus:playStatus value:[NSNumber numberWithBool:YES] trigger:YES
toPlayStatus:requiredPlayerStatusOnExit dictionary:currentFeedMonitorDictionary];
                        [self evaluatePlayStatus:requiredPlayerStatusOnExit];;
                        // do conditional precesses that depend on required playstatus
                        switch (requiredPlayerStatusOnExit) {
                                // user moved the slider of the time code
                                case PlayerRepositioned:
                                {
                                        // we give a play if show is running
                                        if (sharedCommandsPanel.play.style ==
UIBarButtonItemStyleDone) {
                                                [povPlayer play];
                                                [audioControl play];
                                        }
                                }
                                        break;
                                // seeking during the moviola
                                case PlayerStillPaused:
                                {
                                        if (moviolaEnabler.isValid) {
                                                // firing the timer will enable a new gesture recognition
                                                [moviolaEnabler fire];
                                                [self.view setNeedsDisplay];
                                        }
                                }
                                        break;
                                default:
                                        break;
                        }
                }
        } else { // this is the branch of execution for a seek without recursion
                switch (requiredPlayerStatusOnExit) {
                        // synchronized to a keyframe backward in time, at the beginning of
a switching escalation
                        case PlayerHadFirstSeek:
                                // collecting statistical data
                                [sharedFeedMonitor addEvent:FinishedSeekToAudio
playStatus:playStatus value:[NSNumber numberWithBool:YES] trigger:YES
toPlayStatus:requiredPlayerStatusOnExit dictionary:currentFeedMonitorDictionary];
                                [self evaluatePlayStatus:requiredPlayerStatusOnExit];
                                // we give the play command when a first seek reaches a keyframe
backward in time
                                if (povPlayer.rate == 0) {
                                        // collecting statistical data
                                        [sharedFeedMonitor addEvent:PlayCommand
playStatus:SeekToPlayerHadFirstSeek value:nil trigger:NO
toPlayStatus:requiredPlayerStatusOnExit dictionary:currentFeedMonitorDictionary];
                                        [povPlayer play];
                                }
                                break;
                        // povPlayer did have an empty buffer, need to buffer again
                        case PlayerBuffering:
                                // collecting statistical data
                                [sharedFeedMonitor addEvent:FinishedSeekToAudio
playStatus:playStatus value:[NSNumber numberWithBool:YES] trigger:YES
toPlayStatus:requiredPlayerStatusOnExit dictionary:currentFeedMonitorDictionary];
                                [povPlayer play];
                                [povPlayer pause];
                                break;
                        // resuming from a pause
                        case PlayerStillResumed:
                                [self evaluatePlayStatus:requiredPlayerStatusOnExit];
                                [povPlayer play];
                                break;
                        default:
```

| Class "ThumbFive" / method "animatePovInsideThumbnailsAtIndex:" |
| --- |
| ```
                        break;
                    }
                }
            } else { // a previous seek did not finished, either cancelled or superseded by a
successive recursive call
                // collecting statistical data
                [sharedFeedMonitor addEvent:UnfinishedSeekToAudio
playStatus:playerStatusWhenCalling value:[NSNumber numberWithBool:NO]
trigger:NO toPlayStatus:requiredPlayerStatusOnExit
dictionary:currentFeedMonitorDictionary];
            }
        } else { // player status was modified before the async block returned by
execution, switching may have received a cancellation in the meantime
            // collecting statistical data
            [sharedFeedMonitor addEvent:UnfinishedModifiedlayStatusSeekToAudio
playStatus:playerStatusWhenCalling value:nil trigger:NO
toPlayStatus:requiredPlayerStatusOnExit dictionary:currentFeedMonitorDictionary];
        }
    }];
}
``` |

The escalation process of "playStatus", when a video feed is called for a switching, begins with an initial non recursive call to "seekToAudio", this call will exit (if executed with success) with a "playStatus" set to "PlayerHadFirstSeek" and the playhead positioned to the keyframe backward in time in respect to the reference time code.

A collateral effect produced by this first call to "seekToAudio" is that the "AVPlayerItem" will start buffering the content to be reproduced, this will be advantageous for the following seeking that will have already data packets to elaborate in the local cache.

At this point, the ongoing escalation of "playStatus" will produce a new call of "seekToAudio", this time with recursion.

This new recursive call is for the video frame at the exact time code, it will send to the "povPlayer" (the "AVPlayer" object of the "VideoFeed" instance) the message "seekToTime:toleranceBefore:toleranceAfter:completionHandler" with both the arguments "toleranceBefore" and "toleranceAfter" set to "kCMTimeZero", that is the slowest method of messaging a "AVPlayerItem" for a seek.

In some instances, having already done a first seek to a precedent keyframe, and moreover having a buffer already cached, it will execute very fast, with a playhead positioned at the required reference time code.

In this case the "VideoFeed" object may be swapped with the one currently reproduced by the video player, with the desired animation transition.

If after the seeking the video source is not yet synchronized with the reference time code of the audio track, it will call itself again for the recursive seek.

It is to be noted that every new recursive call "seekToAudio" will read again a new time code of reference, because meanwhile that the playhead is seeking, the show is reproducing, and the reference time code is going forward and because of that, the origin video source reproduced on screen may reach a video frame next in time, in the meantime that a "seekToAudio" call is processed. As a consequence the next recursive call must seek an updated value of the reference time code, in order to obtain a perfect synchronization in the destination video source.

The "switching engine" can also be positioned on the server, providing a single streaming flow of audio video data and optimizing the bandwidth consumption, wherein the switching is done at the originating server side.

The Moviola Implementation

An object of the class "UIRotationGestureRecognizer" send messages to the instance of "VideoFeed" corresponding to the video source currently reproduced on screen.

The method "rotation:sender" code listing may be the following:

| Class "VideoFeed" / method "rotation:sender" |
| --- |
| ```
- (IBAction)rotation:(id)sender {
    // check moviola enabler timer
    if (!moviolaEnabler.isValid) {
        if ([sender isKindOfClass:[UIRotationGestureRecognizer class]]) {
            UIRotationGestureRecognizer * gesture = sender;
            // accept interaction only if the show is still paused
            if (sharedCommandsPanel.pause.style == UIBarButtonItemStyleDone) {
                // define a preferred value to normalize the functioning
                int normalized = 3;
                // define a timeout for accepting new seeks
                int timeBeforeReeanableIfNotSeeked = 2;
                // take the value of the event to use for processing
                float velocity = (float)gesture.velocity;
                // create the timer for accepting a new interaction
                moviolaEnabler = [NSTimer
scheduledTimerWithTimeInterval:timeBeforeReeanableIfNotSeeked target:self
selector:@selector(moviolaEnabler:) userInfo:nil repeats:NO];
                // get new time code from rotation
``` |

```
Class "VideoFeed" / method "rotation:sender"

CMTime audioCMTime = [[audioControl audioItem] currentTime];
            float currentTime = CMTimeGetSeconds(audioCMTime);
            float updateTime = currentTime + (velocity / normalized);
            // propagate a new accepted time code
            [sharedCommandsPanel setMoviola:updateTime];
          }
        }
     }
}
```

The method "rotation:sender" check if a timer "moviolaEnabler" is not valid for enabling the processing of the event received (the rotation gesture).

If the timer is valid, it means that a previous gesture is currently elaborating, and the event is discarded.

If the timer is not valid, it means that a timeout occurred or a previous gesture was completely processed, the gesture is accepted and as a consequence a new instance of the timer is created.

This is due to avoid to queuing too many requests and overloading the seeking algorithm.

The "velocity" value of the event is used to calculate a new time code by adding to the audio track time code, if the rotation gesture received is clockwise then the seeking time code will be in the future, otherwise if the rotation is counterclockwise the time code will be backwards in time.

The value that is obtained is passed to an object "sharedCommandsPanel" of the class "CommandsPanel" (described before) for updating the user interface, for example the current time of the show that may be visualized on screen.

The class "CommandsPanel" instantiates a singleton object, so the updating of its property "moviola" is KVO observed by the "AudioControl" object, and the new value is taken for seeking the audio track to the time code derived from recognizing the gesture; see the following code flow:

```
Class "AudioControl" - method
"commandsPanelCallback:change:context:"

-(void)commandsPanelCallback:(NSString *)keyPath ofObject:(id)object
change:(NSDictionary *)change context:(void *)context {
//
// . . .
//
     if (keyPath == @"moviola") {
        moviolaAudioCMTime =
CMTimeMakeWithSeconds(sharedCommandsPanel.moviola, 25);
        [audioItem seekToTime:moviolaAudioCMTime
toleranceBefore:kCMTimeZero toleranceAfter:kCMTimeZero
completionHandler: (BOOL finished) {
           //
           float updateTime =
           CMTimeGetSeconds(audioItem.currentTime);
           [self setMoviola:updateTime];
        }];
     }
     else {
        [super observeValueForKeyPath:keyPath ofObject:object
change:change context:context];
     }
}
```

Also the class "AudioControl" instantiates a singleton object, and as indicated above, its audio track may be used for obtaining the reference time code.

After the seeking of the audio track, the property "moviola" (that is a different variable even if it has the same name of the one we have seen just before for the "CommandsPanel" object) of the singleton of "AudioControl" is updated.

Inside the method above, the singleton of "AudioControl" assign a new value of the property "moviolaAudioCMTime", converting the type "float" of "moviola" to a "CMTime" structure.

This property "moviolaAudioCMTime" will later on used by the "VideoFeed" object.

This property "moviola" of the singleton of "AudioControl" is instead KVO observed by the "VideoFeed" objects; so the one that initially received the gesture (and originated the updating of the time code of the audio track through the "CommandsPanel" singleton) receives a callback for a modification in the reference time code, and updates itself.

See the following method:

```
Class "VideoFeed" - method "seekToAudioTime:fromPlayerStatus:
                 toPlayerStatusOnExit:usingRecursion:"

-(void)audioControlCallback:(NSString *)keyPath ofObject:(id)object
change:(NSDictionary *)change context:(void *)context {
     if (keyPath == @"moviola") {
        //
        if (playStatus == PlayerStillPaused) {
           [self
seekToAudioTime:audioControl.moviolaAudioCMTime
fromPlayerStatus:playStatus toPlayerStatusOnExit:playStatus
usingRecursion:YES];
        }
     }
     else {
        // nothing observed calling super
        [super observeValueForKeyPath:keyPath ofObject:object
change:change context:context];
     }
}
```

This is the method "seekToAudio" explained in details before in the paragraph related to the "Fast Switching", in this case it is being called with the "recursive" argument set to "YES".

The method is called in recursive mode because it is typically carried out either in a slow motion backward in time or forward in time, for going to the video frame of the exact time code of the audio track, which is read in the property "moviolaAudioCMTime".

What is claimed is:

1. A multimedia system comprising:
   a first video buffer configured to accept a first video stream comprising a first plurality of differentially compressed image frames and a first plurality of key frames, the first video stream generated from a first sequence of images of an event perceived at a first video camera angle;
   a second video buffer configured to accept a second video stream comprising a second plurality of differentially compressed image frames and a second plurality of key frames, the second video stream generated from a second sequence of images of the event perceived at a second video camera angle, wherein the first and the second video streams are perceivably aligned in time;

a multimedia processing circuit configured to receive one of the first or the second video stream from the first or the second video buffer respectively, and transmit the received one of the first or the second video stream through a multimedia transmission link;

a communication interface configured to receive via a communications link at an arbitrary instant in time, a request to switch from the transmitted one of the first or the second video stream to the other one of the first or the second video stream, the arbitrary instant in time occurring after a first key frame has been transmitted out of the multimedia processing circuit and before a next key frame is transmitted out of the multimedia processing circuit; and a first processor configured to respond to the request by executing steps comprising:

using a backwards seek procedure for identifying in the other one of the first or the second video stream, a second key frame that precedes the arbitrary instant in time;

using the identified second key frame to execute a forward seek procedure for identifying in the other one of the first or the second video stream, a compressed image frame corresponding to the arbitrary instant in time;

configuring the multimedia processing circuit to switch from the transmitted one of the first or the second video stream to the other one of the first or the second video stream; and configuring the multimedia processing circuit to transmit the other one of the first or the second video stream starting from the compressed image frame corresponding to the arbitrary instant in time.

2. The system of claim 1, wherein the multimedia processing circuit is a part of a server device configured to provide at least one of the first video stream or the second video stream to one or more client devices.

3. The system of claim 2, wherein the server device is configured to provide at least one of a first or a second audio stream to the one or more client devices.

4. The system of claim 3, wherein the at least one of a first or a second audio stream is provided substantially concurrent with providing a respective one of the at least one of the first video stream or the second video stream.

5. The system of claim 4, wherein the first processor is further configured to respond to the request by executing additional steps comprising:

configuring the streaming multimedia server to continue to transmit the at least one of a first or a second audio stream without interruption, upon switching from the transmitted one of the first or the second video stream to the other one of the first or the second video stream.

6. The system of claim 1, wherein the first video buffer, the second video buffer, the multimedia processing circuit, the communication interface, and the first processor are housed in a transmitter unit that is communicatively coupled to a receiver unit, the receiver unit comprising:

a display device; and a second processor configured to execute steps comprising:

recovering from a received one of the first or the second video streams, an uncompressed video signal;

providing the uncompressed video signal to a display driver for displaying on the display device;

detecting initiation of the request; and transmitting the request to the transmitter unit via the communications link.

7. The system of claim 6, wherein initiation of the request is carried out via a graphical user interface displayed on the display device.

8. The system of claim 6, wherein at least a portion of the transmitter unit is integrated into the receiver unit.

9. A method comprising:

storing in a first buffer, a first video stream comprising a first plurality of differentially compressed image frames and a first plurality of key frames, the first video stream generated from a first sequence of images of an event perceived at a first video camera angle;

storing in a second buffer, a second video stream comprising a second plurality of differentially compressed image frames and a second plurality of key frames, the second video stream generated from a second sequence of images of the event perceived at a second video camera angle, wherein the first and the second video streams are perceivably aligned in time;

receiving at an arbitrary instant in time after transmission of a first key frame and during transmission of one of the compressed image frames in the first plurality of differentially compressed image frames, a request to transmit the second video stream in place of the first video stream;

using a backwards seek procedure to identify in the buffered second video stream, a second key frame that precedes the arbitrary instant in time;

using the identified second key frame to execute a forward seek for identifying in the buffered second video stream, a compressed image frame corresponding to the arbitrary instant in time; and transmitting the second video stream starting from the compressed image frame corresponding to the arbitrary instant in time.

10. The method of claim 9, wherein the first and second buffers are contained in a part of a server device configured to provide at least one of the first video stream or the second video stream to one or more client devices.

11. The method of claim 10, further comprising:

providing from the server device, at least one of a first or a second audio stream to the one or more client devices.

12. The method of claim 11, wherein the at least one of a first or a second audio stream is provided substantially concurrent with providing a respective one of the at least one of the first video stream or the second video stream.

13. The method of claim 9, wherein the backwards seek procedure comprises ignoring a set of compressed image frames in the buffered second video stream that correspond to a set of compressed image frames in the first video stream, wherein the set of compressed image frames in the first video stream has been transmitted after transmission of the first key frame.

14. The method of claim 13, wherein using the forward seek comprises ignoring the set of compressed image frames in the buffered second video stream that correspond to the set of compressed image frames in the first video stream that has been transmitted after transmission of the first key frame.

15. The method of claim 14, wherein the first sequence of images of the real-time event is captured by orienting a first video camera at a first angle, and wherein the second sequence of images of the real-time event is captured by orienting a second video camera at a second angle that is different than the first angle.

16. The method of claim 14, wherein at least one of the first or the second sequence of images of the real-time event is a computer-generated sequence of images.

17. The method of claim 14, wherein the first sequence of images of the real-time event is captured by a first video camera, and the second sequence of images is computer-generated from the first sequence of images.

18. The method of claim 9, further comprising:
transmitting an audio signal along with the first video stream; and
continuing transmitting of the audio signal without interruption when transmitting the second video stream starting from the compressed image frame corresponding to the arbitrary instant in time.

19. A non-transitory computer-readable storage medium having stored thereon, instructions that when executed by a processor implement a method comprising the steps of:
storing in a first buffer, a first video stream comprising a first plurality of differentially compressed image frames and a first plurality of key frames, the first video stream generated from a first sequence of images of an event perceived at a first video camera angle;
storing in a second buffer, a second video stream comprising a second plurality of differentially compressed image frames and a second plurality of key frames, the second video stream generated from a second sequence of images of the event perceived at a second video camera angle, wherein the first and the second video streams are perceivably aligned in time;
detecting the receiving of a message at an arbitrary instant in time after transmission of a first key frame and during transmission of one of the compressed image frames in the first plurality of differentially compressed image frames, the message comprising a request to transmit the second video stream starting from the arbitrary instant in time;
using a backwards seek procedure to identify in the buffered second video stream, a second key frame preceding the arbitrary instant in time;
using the identified second key frame to execute a forward seek procedure to identify in the buffered second video stream, a compressed image frame that corresponds to the arbitrary instant in time; and
transmitting the second video stream starting from the compressed image frame that corresponds to the arbitrary instant in time.

20. The non-transitory computer-readable storage medium of claim 19, wherein one or more software players is used for executing one or more of the method steps.

21. The non-transitory computer-readable storage medium of claim 19, further comprising instructions for generating the second sequence of images from the first sequence of images, wherein the first sequence of images is captured by a first video camera.

22. A method comprising:
storing in a first video buffer of a multimedia transmitter, a first video stream comprising a first plurality of differentially compressed image frames and a first plurality of key frames, the first video stream generated from a first sequence of images of an event perceived at a first video camera angle;
storing in a second video buffer of the multimedia transmitter, a second video stream comprising a second plurality of differentially compressed image frames and a second plurality of key frames, the second video stream generated from a second sequence of images of the event perceived at a second video camera angle, wherein the first and the second video streams are perceivably aligned in time;
receiving in the multimedia transmitter, at an arbitrary instant in time after transmission of a first key frame and during transmission of one of the compressed image frames in the first plurality of differentially compressed image frames, a first request to replace a previously transmitted image perceived at the first video camera angle, with a corresponding image perceived at the second video camera angle, wherein the previously transmitted image has been placed in a paused state in a receiver communicatively coupled to the multimedia transmitter;
using a backwards seek procedure to identify in the buffered second video stream, a second key frame that corresponds to the transmitted first key frame;
using the identified second key frame to execute a forward seek procedure for identifying in the buffered second video stream, the corresponding image perceived at the second video camera angle; and
transmitting to the receiver, an image frame containing the corresponding image perceived at the second video camera angle.

23. The method of claim 22, further comprising:
receiving in the multi-media transmitter, following the first request, a second request to provide support for performing one of the following operations in the receiver: a) a frame-by-frame forward-play operation starting at the corresponding image perceived at the second video camera angle, b) a frame-by-frame backwards-play operation starting at the corresponding image perceived at the second video camera angle, c) a slow-motion forward-play operation starting at the corresponding image perceived at the second video camera angle, d) a slow-motion backwards-play operation starting at the corresponding image perceived at the second video camera angle; and
in response to the second request, transmitting from the transmitter a corresponding one of: e) a first set of image frames succeeding the corresponding image perceived at the second video camera angle, f) a second set of image frames preceding the corresponding image perceived at the second video camera angle, g) a third set of image frames succeeding the corresponding image perceived at the second video camera angle, and h) a fourth set of image frames preceding the corresponding image perceived at the second video camera angle.

24. The method of claim 23, wherein at least one of the first, second, third, or fourth set of images is transmitted from the transmitter at a first frame rate that is different than a second frame rate used for transmitting another one of the first, second, third, or fourth set of images.

25. The method of claim 22, further comprising:
transmitting an audio signal; and
continuing transmitting of the audio signal without interruption when transmitting the image frame containing the corresponding image perceived at the second video camera angle.

26. The method of claim 25, wherein the audio signal is transmitted along with the first video stream.

27. The method of claim 25, wherein the audio signal is transmitted independent of the first and the second video streams.

* * * * *